US008185964B2

(12) United States Patent
Marchese

(10) Patent No.: US 8,185,964 B2
(45) Date of Patent: *May 22, 2012

(54) DIGITAL VIDEO SYSTEM USING NETWORKED CAMERAS

(76) Inventor: Joseph Robert Marchese, Ray, MI (US)

( * ) Notice: Subject to any disclaimer, the term of this patent is extended or adjusted under 35 U.S.C. 154(b) by 196 days.

This patent is subject to a terminal disclaimer.

(21) Appl. No.: 12/708,394

(22) Filed: Feb. 18, 2010

(65) Prior Publication Data
US 2010/0212024 A1    Aug. 19, 2010

Related U.S. Application Data

(63) Continuation of application No. 11/125,795, filed on May 10, 2005, now abandoned, which is a continuation of application No. 09/808,543, filed on Mar. 14, 2001, now Pat. No. 6,891,566.

(60) Provisional application No. 60/189,162, filed on Mar. 14, 2000.

(51) Int. Cl.
H04L 29/06 (2006.01)
(52) U.S. Cl. ......................................... 726/29
(58) Field of Classification Search ................... 726/27, 726/29
See application file for complete search history.

(56) References Cited

U.S. PATENT DOCUMENTS

| 4,513,318 | A | 4/1985 | Wilensky et al. |
| 4,575,124 | A | 3/1986 | Morrison |
| 4,628,342 | A | 12/1986 | Desmons et al. |
| 4,814,869 | A | 3/1989 | Oliver |
| 4,991,193 | A | 2/1991 | Cecil et al. |
| 5,155,585 | A | 10/1992 | Ishikawa |
| 5,311,306 | A | 5/1994 | Tanaka et al. |
| 5,313,280 | A | 5/1994 | Straus |
| 5,512,974 | A | 4/1996 | Abe et al. |
| 5,561,476 | A | 10/1996 | Kershaw et al. |
| 5,625,410 | A | 4/1997 | Washino et al. |
| 5,649,185 | A * | 7/1997 | Antognini et al. ............. 726/2 |
| 5,663,951 | A | 9/1997 | Danneels et al. |

(Continued)

FOREIGN PATENT DOCUMENTS
GB    2329541    3/1999
(Continued)

OTHER PUBLICATIONS

International Search Report for PCT/US01/08133, Jul. 26, 2001, 3 pages.

(Continued)

Primary Examiner — David García Cervetti
(74) Attorney, Agent, or Firm — Brooks Kushman P.C.

(57) ABSTRACT

A digital video system including a computer connected via a network to a number of video servers and cameras. The computer includes a program that provides a grid of display windows, each of which displays an image received from the camera associated with that window. The program sequentially polls each camera, accessing and displaying an image from the camera in its associated window. The program can access the cameras at different frame rates. The program stores image streams in a single file, concatenating each successive image onto the end of the file. The file is then indexed using SOI and EOI markers to permit fast access to individual images within the file. The program can monitor received video and automatically start recording upon detecting motion within the video stream. Motion detection is implemented by comparing color component values for pixels from different images.

4 Claims, 19 Drawing Sheets

U.S. PATENT DOCUMENTS

| | | | |
|---|---|---|---|
| 5,666,152 A | 9/1997 | Stoker | |
| 5,724,475 A | 3/1998 | Kirsten | |
| 5,745,161 A | 4/1998 | Ito | |
| 5,761,655 A | 6/1998 | Hoffman | |
| 5,786,872 A | 7/1998 | Miyazaki et al. | |
| 5,790,548 A * | 8/1998 | Sistanizadeh et al. | 370/401 |
| 5,790,664 A * | 8/1998 | Coley et al. | 709/203 |
| 5,805,801 A | 9/1998 | Holloway et al. | |
| 5,861,924 A | 1/1999 | Pan et al. | |
| 5,903,762 A * | 5/1999 | Sakamoto et al. | 717/178 |
| 6,002,428 A | 12/1999 | Matsumura et al. | |
| 6,002,995 A | 12/1999 | Suzuki et al. | |
| 6,014,183 A | 1/2000 | Hoang | |
| 6,092,078 A | 7/2000 | Adolfsson | |
| 6,101,182 A * | 8/2000 | Sistanizadeh et al. | 370/352 |
| 6,115,035 A | 9/2000 | Compton et al. | |
| 6,175,622 B1 | 1/2001 | Chiniwala et al. | |
| 6,178,419 B1 | 1/2001 | Legh-Smith et al. | |
| 6,233,428 B1 | 5/2001 | Fryer | |
| 6,269,309 B1 | 7/2001 | Buckingham | |
| 6,396,533 B1 | 5/2002 | Hudson | |
| 6,449,426 B1 | 9/2002 | Suga et al. | |
| 6,452,925 B1 * | 9/2002 | Sistanizadeh et al. | 370/352 |
| 6,516,340 B2 | 2/2003 | Boys | |
| 6,539,124 B2 | 3/2003 | Sethuraman et al. | |
| 6,574,612 B1 * | 6/2003 | Baratti et al. | 705/59 |
| 6,583,813 B1 | 6/2003 | Enright et al. | |
| 6,591,022 B2 | 7/2003 | Dewald | |
| 6,760,324 B1 * | 7/2004 | Scott et al. | 370/352 |
| 6,763,023 B1 | 7/2004 | Gleeson et al. | |
| 6,891,566 B2 | 5/2005 | Marchese | |
| 6,895,511 B1 * | 5/2005 | Borsato et al. | 726/5 |
| 6,928,656 B1 * | 8/2005 | Addington | 725/111 |
| 7,136,838 B1 * | 11/2006 | Peinado et al. | 705/59 |
| 7,185,240 B2 | 2/2007 | Saito et al. | |
| 7,289,995 B2 | 10/2007 | Motoyama et al. | |
| 7,392,310 B2 | 6/2008 | Motoyama et al. | |
| 7,451,312 B2 * | 11/2008 | Medvinsky et al. | 713/168 |
| 7,478,152 B2 | 1/2009 | Holt et al. | |
| 7,500,003 B2 | 3/2009 | Motoyama et al. | |
| 7,523,481 B2 * | 4/2009 | Creamer et al. | 725/105 |
| 7,596,749 B2 | 9/2009 | Motoyama et al. | |
| 7,610,380 B2 | 10/2009 | Igarashi et al. | |
| 2001/0008014 A1 | 7/2001 | Farrell et al. | |
| 2001/0011253 A1 * | 8/2001 | Coley et al. | 705/59 |
| 2001/0033335 A1 | 10/2001 | Kubota et al. | |
| 2002/0003575 A1 * | 1/2002 | Marchese | 348/231 |
| 2003/0050718 A1 | 3/2003 | Tracy et al. | |
| 2003/0197785 A1 * | 10/2003 | White et al. | 348/207.99 |
| 2004/0030926 A1 * | 2/2004 | Clark | 713/201 |
| 2004/0078825 A1 * | 4/2004 | Murphy | 725/109 |
| 2004/0128315 A1 | 7/2004 | Motoyama et al. | |
| 2004/0128365 A1 | 7/2004 | Motoyama et al. | |
| 2004/0209617 A1 | 10/2004 | Hrastar | |
| 2004/0214559 A1 | 10/2004 | Date et al. | |
| 2004/0240453 A1 | 12/2004 | Ikeda et al. | |
| 2005/0165927 A1 | 7/2005 | Motoyama et al. | |
| 2005/0200714 A1 | 9/2005 | Marchese | |
| 2005/0201273 A1 | 9/2005 | Shimizu | |
| 2005/0231596 A1 | 10/2005 | Marchese | |
| 2005/0268141 A1 | 12/2005 | Alben et al. | |
| 2006/0059255 A1 | 3/2006 | Motoyama et al. | |
| 2006/0067304 A1 | 3/2006 | McDowall et al. | |
| 2006/0106729 A1 | 5/2006 | Roberts, Jr. | |
| 2006/0159032 A1 | 7/2006 | Ukrainetz et al. | |
| 2006/0279774 A1 | 12/2006 | Matsuoka et al. | |
| 2007/0011450 A1 | 1/2007 | McCreight et al. | |
| 2007/0124455 A1 | 5/2007 | Motoyama et al. | |
| 2007/0237141 A1 | 10/2007 | Marchese | |
| 2008/0189405 A1 | 8/2008 | Zarenin et al. | |
| 2009/0019141 A1 | 1/2009 | Bush et al. | |

FOREIGN PATENT DOCUMENTS

| | | |
|---|---|---|
| JP | 2004178565 | 6/2004 |
| WO | WO98/34360 | 8/1998 |
| WO | WO01/69405 | 9/2001 |

OTHER PUBLICATIONS

Supplemental European International Search Report for EP 01 91 6650, Feb. 4, 2009, 1 page.

Bisdikian et al. "On the Effectiveness of Priorities in Token Ring for Multimedia Traffic," in Proc. 18th Annual Conference Local Computer Networks, Minneapolis, MN, Sep. 1993, pp. 25-31.

A Brief History of the Cygwin Project, retrieved from http://cygwin.com/history.html, Jun. 14, 2994, 18 pages.

Marshall K. McKusick, et al. "A Fast File System for UNIX," ACM Transactions on Computer Systems, vol. 2, No. 3, Aug. 1984, pp. 181-187.

AR(4) Man Page, retrieved Sep. 2, 2003 from http://docs.sun.com/db/doc/801-6680-01/6i11qc0ml?a=view, 4 pages.

Tar(1) Man Page for Solaris 2.4, retrieved Sep. 2, 2003 from http://docs.sun.com/db/doc/801-6680-01/6i11qc0ml?a=view, 8 pages.

AR(1) Man Page, retrieved Sep. 2, 2003 from http://docs.sun.com/db/doc/801-6680-01/6i11qc0ml?a=view, 3 pages.

Beausoft Main Page Archive (Feb. 29, 2000), retrieved from http://web.archive.org/web/2000229205711/http://beausoft.com/, 2 pages.

R. Fielding, et al., "Request for Comments (RFC) 2068", Hypertext Transfer Protocol—HTTP/1.1, Jan. 1997, 162 pages.

JPEG Standard, ISO/IEC IS 10918-1 ITU-T Recommendation T.81, Sep. 1992, 186 pages.

Webcam Watcher Online Help, Webcam Watcher Version 3.0, Copyright 2001 Beau Software, date unknown, 6 pages.

Beausoft Webcam Watcher Description Page (Feb. 29, 2000), retrieved from http://web.archive.org/web/2000620224026/www.webcam-watcher.com/wcwindex.html, 4 pages.

* cited by examiner

```
[Initialize]                                            PingTimeout = 5000                    RecordImagesBasePath = C:\Test
WindowState = NORMAL
Display = Image                                         PingOnImageRequest = FALSE            DefaultEmailRecipient
DisplayWidth =11505                                     HighliteFrameColor =16744448          =marchesej@teleweb.net
BorderWidth =2                                          ;HighliteFrameColor = &H00&           EMailUserID =marchese2
SkipInactivePorts = True                                FlashFrameColor = &H000000FF&         EmailUSerPW =sdsdsdsd
Images_Across =4                                        ViewBackColor = &H00808080&           ShowMotionBorder = TRUE
Images_Down =2                                          CameraCaptionForeColor =              EnableStatusLog = TRUE
Ref_Image_Width =352                                    &H00FF00&                             EnableErrorLog = TRUE
Ref_Image_Height =240                                   CameraCaptionBackColor = &H00&        [Camera Servers]
ShowHighliteFrames =TRUE                                TCPPort = 1111                        Camera_Database = C:\Program
ShowRecordIndicators =TRUE                              HTTPPort = 80                         Files\Softsite32\Database\SoftSite.mdb
ShowCameraCaptions =TRUE                                MaxFailOverCount =50                  [Stream Applet]
ShowPortNumbers =TRUE                                   ReconnectAttemptIntervalSecs =60      StreamViewMode = 2
                                                        RecordMode = MULTIPLE,24              StreamIntervalSeconds = 0
                                                        RecordThumbNails = TRUE               StreamMaxFPS = 0
                                                                                              StreamRecord = 0
```

*Fig. 4*

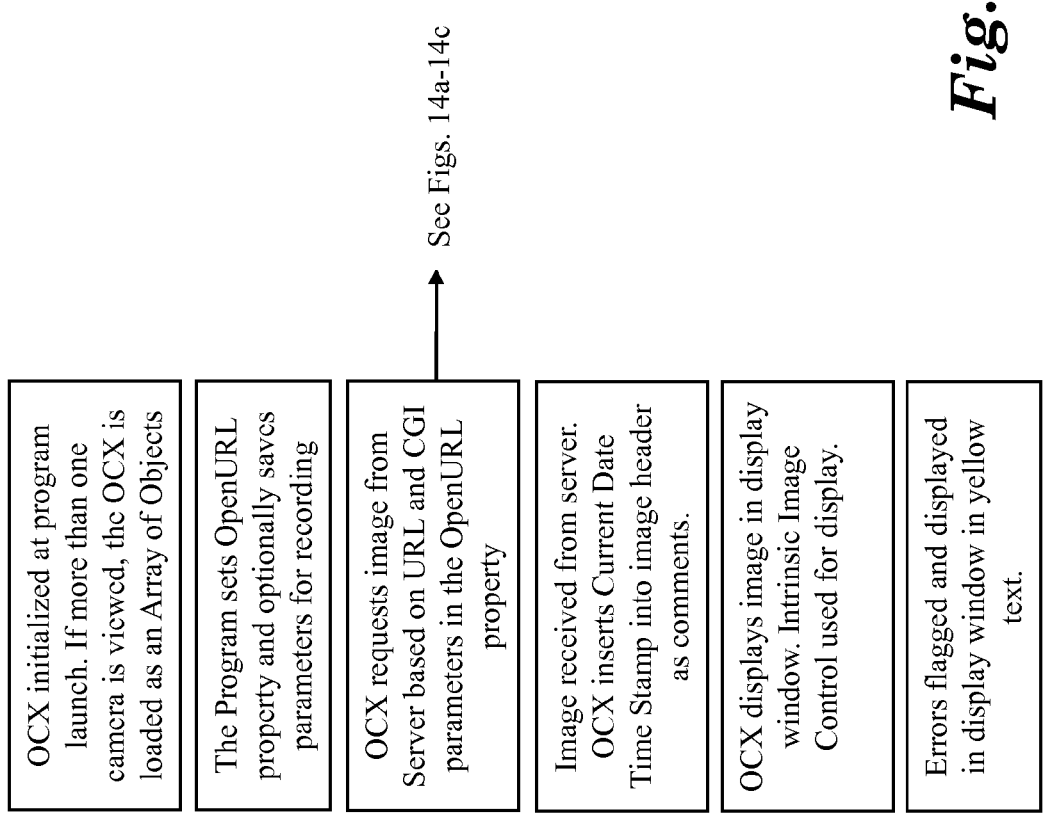

DIGITAL VIDEO SYSTEM USING NETWORKED CAMERAS

CROSS-REFERENCE TO RELATED APPLICATION

This application is a continuation of U.S. application Ser. No. 11/125,795 filed May 10, 2005, now abandoned, which is a continuation of U.S. application Ser. No. 09/808,543, filed Mar. 14, 2001, now U.S. Pat. No. 6,891,566, which claims the benefit of Provisional Patent Application 60/189,162 filed Mar. 14, 2000. The entire disclosure of these applications are hereby incorporated by reference.

TECHNICAL FIELD

This invention relates to systems for accessing, recording, and displaying camera images from any of a number of remotely located cameras and, more particularly, to such systems that provide access to images from one or more remote cameras over a public or private computer network.

BACKGROUND OF THE INVENTION

With the continuing expansion and availability of public and private computer networks it is becoming increasingly common to use these networks for remote video and image surveillance. Historically, analog systems have been used for CCTV systems for purposes such as surveillance. They include an analog video camera, a video cable, and a monitor/TV and/or a VCR recording device. Multiple cameras can be hooked to multiple recording VCRs for complete coverage of one or more target areas. Specialized equipment known as a multiplexer or 'MUX' can be used to allow multiple cameras to be hooked to a single recording/view device. The multiplexer takes all video feeds in a sequential fashion, recording from one camera at a time. This allows the quantity of cameras to share a single recording tape. Besides the limitations of a serial tape system, additional limitations are introduced when the sequencing rate of the multiplexer is too slow to allow sufficient video record/view speed of a given camera view. Multiplexers are typically expensive and have limited expandability without purchasing additional complete systems. Also, the configuration of these systems usually requires a skilled technician to be available at the systems site which increases the total cost of implementing such systems.

Digital systems have become more prevalent with the advent of standardized digital componentry. These systems utilize the same analog cameras and cabling, but introduce a capture card based collector. This collector can be a proprietary digital device or a PC based computer, either of which has analog video inputs directly connected to it. These inputs convert the video to digital for viewing and recording and may even retransmit the signal to analog tape for recording purposes. A factor limiting these digital systems is that an autonomous computer is required relatively near the video sources, sometimes with user intervention required at regular intervals. These machines are also hardware bound. The number of capture cards is limited to the specific design of the collecting equipment. These systems are usually proprietary to a particular manufacturer and can be very expensive. Remote viewing is usually not available. Failover or redundancy function is also limited and expensive, due to the fact that the system is usually duplicated for redundancy. As with the analog systems discussed above, these systems also have configuration requirements that typically require a skilled technician.

There now exists commercially available networkable cameras that can be accessed over networks running TCP/IP, including both LANs and global networks such as the Internet. Ethernet-based digital video servers are now common that are small, autonomous, and usually contain a web-based configuration utility, as well as administration software. These cameras can be accessed and, in the case of pan/tilt/zoom (PTZ) cameras, controlled over the network using an assigned IP address and standard CGI-based URL syntax or other manufacturer-specified addressing protocols. This allows an authorized user to control the product from anywhere via the Internet or a dialup connection, and allows live images and image streams (video) to be accessed remotely using standard web browsers.

The video servers exist in two forms. One is a camera server that is a complete product containing both a camera and a web server with an Ethernet port. The other is a component based video server with inputs for one or more analog video feeds, which the user can connect to conventional camera PAL or NTSC video feeds. The inputted analog video feeds are converted to digital signals and sent from the video servers' Ethernet port. Thus, the video servers (whether integrated in as part of a camera server or as a standalone unit) can be connected to the Ethernet-based networks commonly used in businesses and other computer enabled sites. These video servers can be connected to these network segments and are fully compatible with existing data on these networks. The video data can be received by standard PC computers which require no special hardware other than an Ethernet connection. The cameras can be easily configured by a novice user who has very basic experience with the Internet.

Ethernet video servers connect to an Ethernet connection and deliver digital video based on user requests or internal scripting agents. A user requests video images via standard CGI enhanced URL syntaxes. These syntaxes control the image metrics and other features of the requested video stream. The images are sent to the user as either static JPG snapshots, or as continuous JPG streams. Rates to 30 FPS are easily attainable. Since these images are delivered by Ethernet, the camera servers are very robust. Although a requested image may not be received completely in an expected time frame, the video server will wait for the user to complete its requests and processing. This virtually guarantees delivery of video, except where a connection to the video server is terminated.

When the user requests a video image or stream, the user is actually requesting a static image that appears to exist as a file in a directory structure on the video server. When the user requests a copy of this image, the video server actually updates it with a new image from the camera source, and the user receives a picture that is up to date. Subsequent requests are to the identical file name, and the server does the updating of its content.

Although IP-based network cameras and camera servers have now evolved to a relatively advanced state, the use of a browser-based interface to this hardware has seemingly impeded development of user interfaces that provide simplified, automated control over the acquisition of snapshot and streaming images over the network. Access to the camera images typically requires knowledge of the manufacturer's CGI-based syntax to access snapshot or streaming images. For example, to access a particular camera, the user may have to specify to the browser an address in the form of http//Uid: PW@111.111.111.111/cgi-bin/fullsize.jpg?camera=1&compression=1. While this may be handled easily enough for a single camera by bookmarking or pulling the URL out of the browser's history buffer, the task becomes more difficult when the user desires to change the access parameters or where different cameras need to be accessed. Where the identified camera cannot be accessed, such as for example due to an improper address being specified, the user may simply receive a standard "404 not found" error message that is not helpful in diagnosing either the error or actual reason why access was not available.

Moreover, browser-based access is typically limited to either a snapshot mode or streaming images. In the snapshot mode, a single image is returned when the appropriate URL is entered into the browser. Subsequent images from the camera are then accessed using the browser's "reload" or "refresh" button. In the streaming mode, once the appropriate URL is specified, the remote server or camera simply begins streaming image files back to the browser. This results in relatively high network utilization that may be undesirable in a shared network environment.

It is therefore a general object of this invention to provide an improved user interface and approach to the network transmission of images from commercially available network cameras.

SUMMARY OF THE INVENTION

In accordance with the invention, there is provided a digital video system which includes a client computer, one or more video servers accessible by the client computer over a network, and a plurality of cameras connected to the video servers. The one or more video servers provide an interface between the cameras and client computer, with images from the cameras being accessed by the video servers and then sent to the client computer upon request by the client computer. The client computer provides a user interface display on the computer that includes a display window for each of the cameras accessed over the network and that displays in each of the display windows an image received from the camera associated with that display window.

In accordance with another aspect of the invention, there is provided a computer readable medium for use by the client computer in providing the user interface display. The computer readable medium includes a digital storage device and a user interface program stored on the digital storage device in computer readable form. The program is operable upon execution by the computer to access camera data uniquely identifying the cameras and to attempt access to the cameras over the network using the camera data. The program is further operable to verify access to those ones of the cameras that are accessible over the network and to generate the user interface display and to display in each of the display windows an image received from the camera associated with that display window.

In accordance with another aspect of the invention, there is provided a computer readable medium and method for use by a computer in detecting motion in a sequence of color video images received by the computer. The computer readable medium includes a digital storage device containing a program that is operable to carry out the motion detection. The program selects one of the video images as a reference image and another of the video images as a selected image to be compared to the reference image. The program then accesses a color component value for each of a number of pixels from the reference image and for each of a number of corresponding pixels from the selected image, with the program being operable to perform pixel comparisons using the color component values and to generate a motion detect signal when the difference in color component values for corresponding pixels from the reference and selected images differ by more than a preselected amount.

In accordance with yet another aspect of the invention, there is provided a computer readable medium and method for use by a computer in recording a sequence of images, each of which comprises an individual image file in which the image is represented in a graphics file format that includes a first marker identifying the start of the image and a second marker identifying the end of the image. The computer readable medium includes a digital storage device containing a program that is operable to carry out the recording. The program stores the images together as a single file that comprises the group of images concatenated together in sequential order. The program is operable to index the file using the first and second markers. This index can then be used to provide quick access to individual images stored within the single file.

BRIEF DESCRIPTION OF THE DRAWINGS

Preferred exemplary embodiments of the invention will hereinafter be described in conjunction with the appended drawings, wherein like designations denote like elements, and wherein:

FIG. 4 shows the contents of the initialization file used by the user interface client application of FIG. 1;

FIG. 13 is an overview of an OCX control used by the user interface client and stream recorder client applications of FIG. 1;

DETAILED DESCRIPTION OF THE PREFERRED EMBODIMENTS

Figure 1:
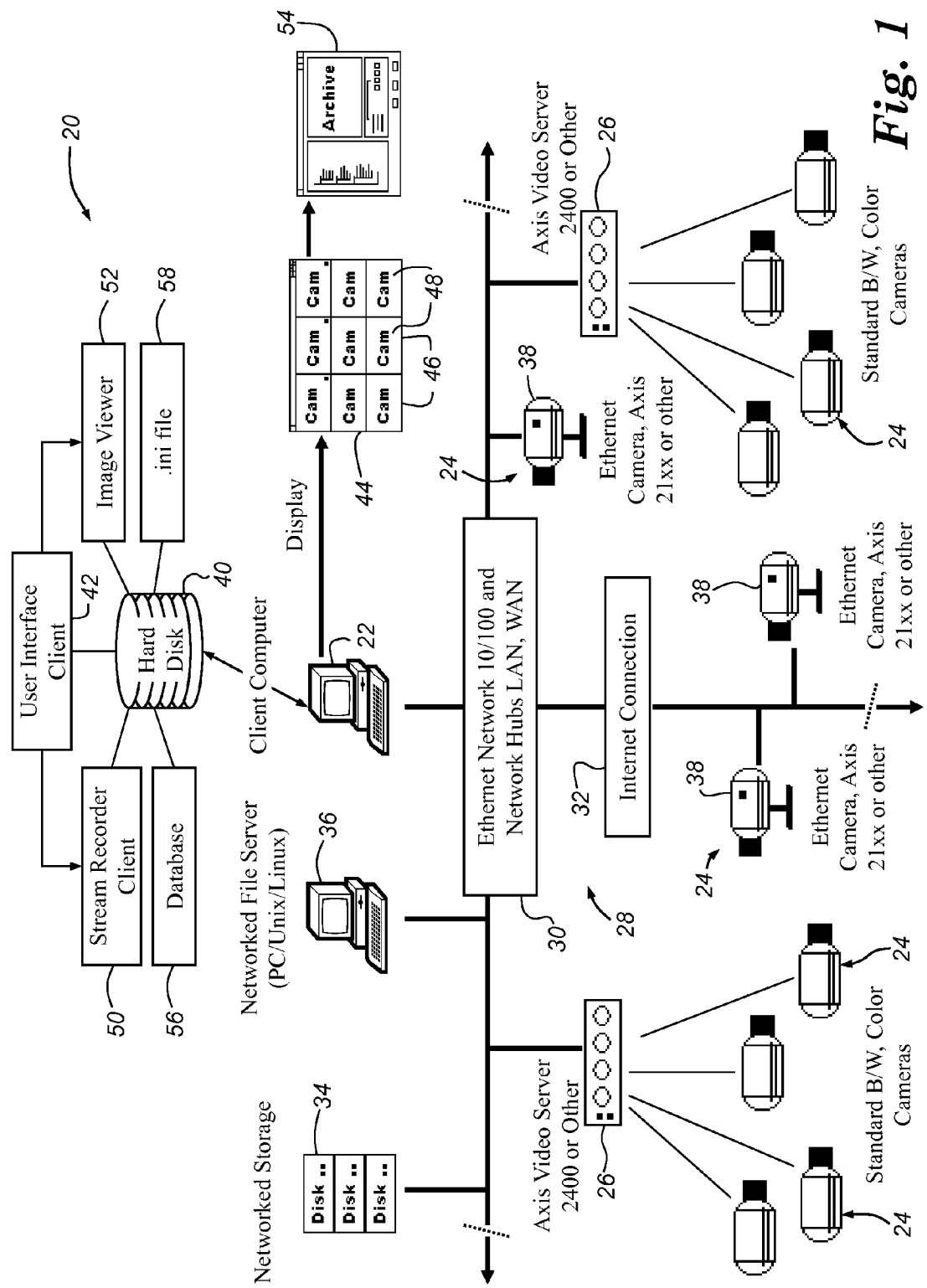
FIG. 1 is a block diagram showing a preferred embodiment of a digital video system of the present invention.

Referring to FIG. 1, there is shown a network setup of a digital video system 20 of the present invention. The video system 20 includes a client computer 22, a plurality of cameras 24, and one or more standalone video servers 26. The client computer is connected to the cameras 24 and video servers 26 via a network 28 which can include a private network segment 30 and a public network such as the Internet 32. Other networked components can be used such as a networked storage device 34 and a networked file server 36. Some of the cameras 24 comprise camera servers 38 which include both a video server and camera in a single integrated unit. The camera servers 38 can be, for example, Axis™ 200, 200+, or 2100 Ethernet cameras, available from Axis Communications Inc., Chelmsford, Mass. (www.axis.com). The video servers 26 can be Axis™ 2400, 2401, or 240 video servers, also available from Axis Communications, Inc. The cameras 24 that are connected to the video servers 26 can be industry standard PAL or NTSC video cameras. Client computer 22 can be a conventional personal computer having an Intel™ or compatible CPU running a Windows™ operating system and including a network interface card (not shown) for connecting to the 10/100 Mb Ethernet network 30 that uses the TCP/IP network protocol.

In accordance with the invention, client computer 22 includes a computer readable memory, such as a fixed hard drive shown at 40 containing magnetic media for digital storage of a user interface client application 42 that includes a user interface program along with a number of additional software components. The user interface program is in computer readable form (such as an .exe file). The additional software components include Microsoft™ Internet Explorer™ Internet extensions (included with Windows™ 95, 98, ME, 2000 and revisions), the Win32API libraries (included with Windows™ operating systems), the WinInet-.dll (also included with Windows™ operating systems), and a compression library such as IJL115.dll (available from Intel™) to decode and recompress jpeg images received from the cameras 24.

Although the user interface client program 42 is shown as being stored on a hard drive 40, it will be appreciated that it can be stored on other digital storage devices as well. As used in the specification and claims, "digital storage device" includes any of a variety of different digital storage devices, including magnetic media such as a hard disk or removable disk, optical storage media such as a CDROM or DVD, or magneto-optical media.

In general, the user interface client program 42 is operable to access locally stored camera data that uniquely identifies the cameras 24 and then attempts access to those cameras over the network 28. The program 24 is operable to verify access to at least those cameras 24 that are currently accessible, and to generate a user interface display 44 (on the computer's monitor) that includes a display window 46 for each of the cameras 24 accessed over the network 28, and to display in each of the display windows 46 an image 48 received from the camera associated with that display window. As used in the specification and claims in reference to the program 42 or other executable program code, the phrase "operable to" [carry out some action] means that, when executed by a microprocessor or other processing device of the computer, the program directs the microprocessor to carry out or otherwise cause execution of the specified action.

In addition to the user interface client application 42, the hard drive 40 also contains a stream recorder client application 50 and an image viewer 52. Stream recorder client 50 permits high speed recording of streamed images (video) in a manner that minimizes network bandwidth utilization. Image viewer 52 permits browsing and viewing of archived images and video using a playback screen display 54. These two programs 50, 52 are discussed farther below in connection with FIGS. 10-12 (for viewer program 52) and FIG. 16 (for stream recorder client 50). All three programs 42, 50, and 52 can be developed under Visual Basic 6.0 and Visual C++ 6.0 and designed to run under Windows™ 95, 98, ME, NT, and 2000. User interface client 42 stores all camera, server and image settings to a Microsoft Access™ 7.0 database 56 and camera and user configuration data is stored in an .ini file 58. Digitized recorded video is stored directly on hard disk 40.

Figure 2:
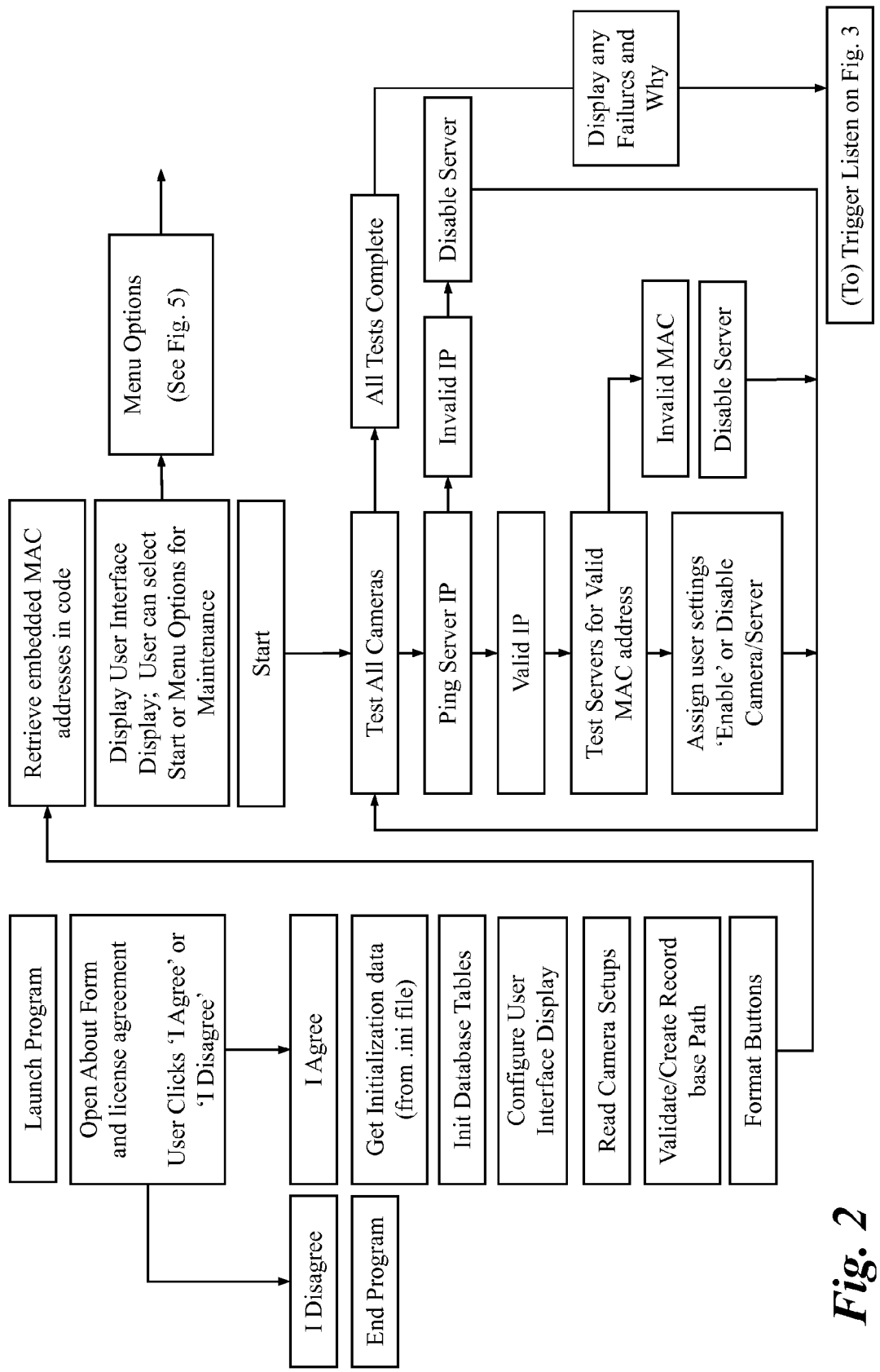
FIGS. 2 and 3 together depict the process flow of the user interface client application of FIG. 1.
Figure 3:
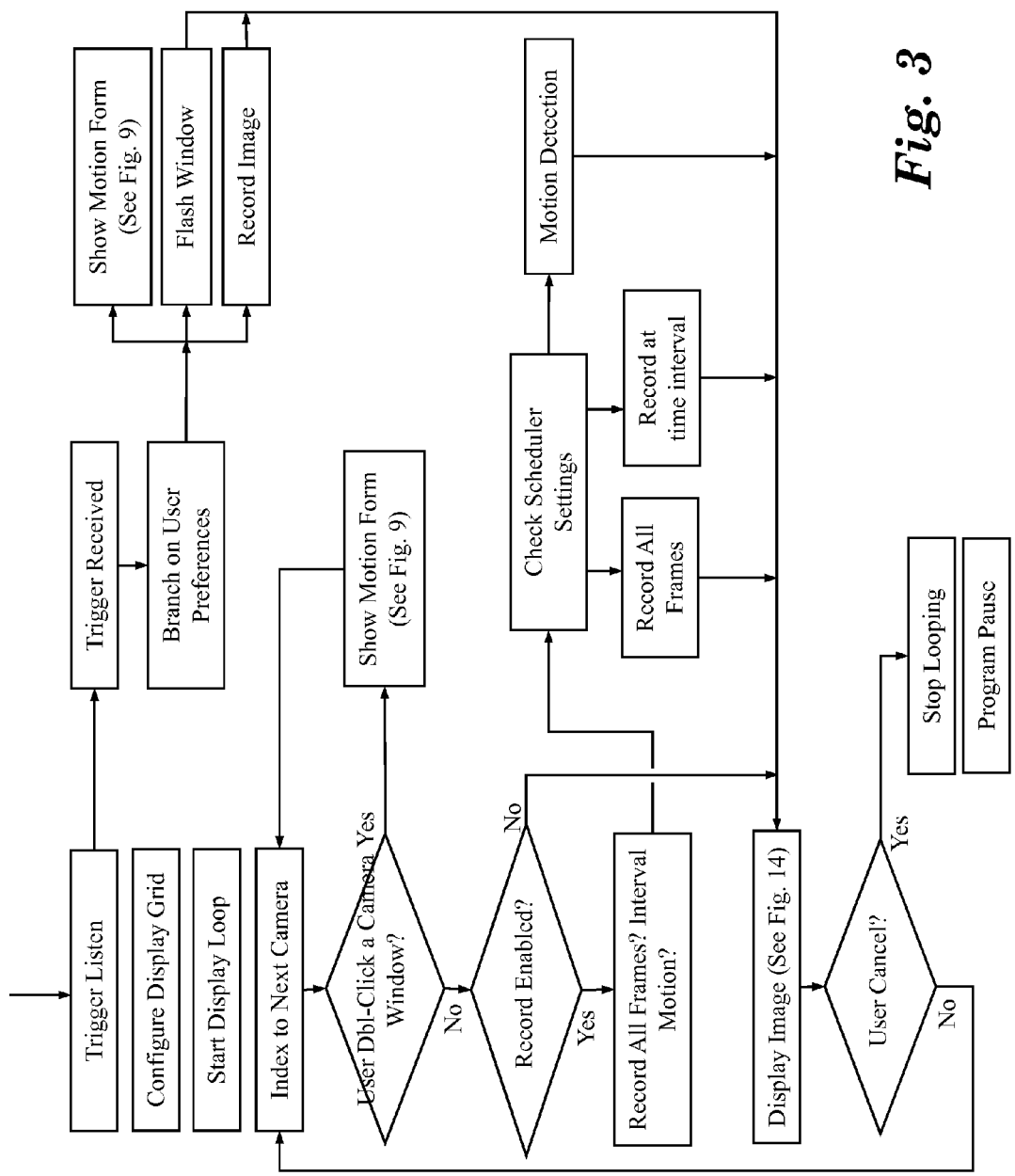

The user interface client application 42 is depicted in various levels of detail by FIGS. 2-9 and 13-15, and 17a-17b, with FIGS. 2 and 3 together representing the complete process flow through the application starting from program launch. As shown in FIG. 2, once the user has consented to the licensing terms for use of the program, various initialization steps are performed, including:
1. getting camera and user configuration data from the .ini file 58;
2. initializing the database tables 56;
3. configuring the layout of the display form 44 on the client computer 22;
4. reading the camera setups from the database table 56;
5. validating or creating the base path (directories) for recording of images and image streams;
6. formatting user-selectable buttons for the client user interface 44; and
7. retrieving embedded MAC addresses for purposes of validating access to the cameras 24 identified in the database 56.

Figure 5:
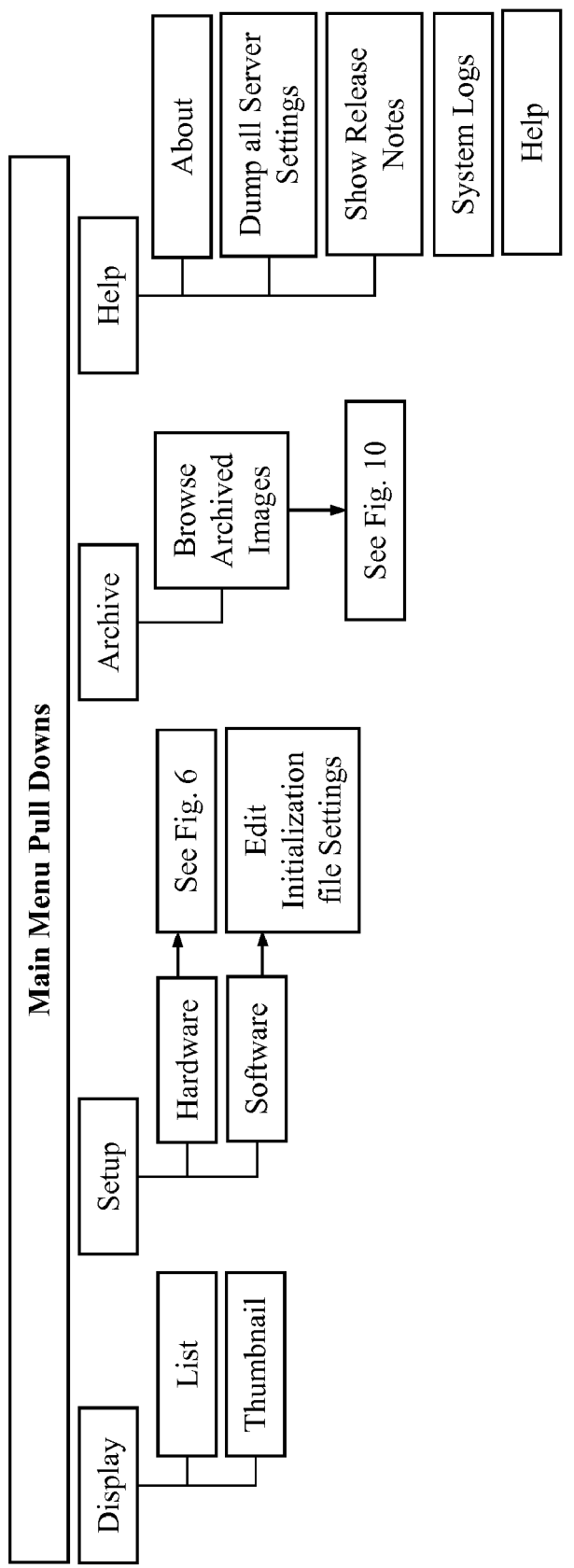
FIG. 5 is a diagram depicting the main menu structure of the user interface client application.

Thereafter, program 42 generates the user interface display 44 and the user can start accessing images or video or can access various menu options shown in FIG. 5 for purposes of maintenance or changing of setup information. If the user has selected "start" to begin accessing images or video, then the next step is to initialize and test the cameras and/or servers by verifying the IP addresses, testing for a valid MAC addresses, and, if the IP addresses and MAC addresses are valid, assigning the user settings and enabling or disabling individual cameras or servers. As is known, the MAC addresses are unique to each camera and server and can be queried via FTP requests to protected areas of the camera or server's memory. Specific locations vary by manufacturer and require parsing and formatting to extract the required data, as will be known by those skilled in the art. This enables the software to be licensed on a per-camera or per-server basis and can be used to prevent access to any cameras or servers for which the user is not licensed.

For each camera in the database 56, all control information assigned to that camera is stored in an array data type. This control information includes: Server Enabled, Server Name, Server Model, Server ID, Server IP, Server Mac, Server User ID, Server PW, Server Port, Cam ID, Cam Model, Cam Enabled, Cam Name, Cam Location, Cam Bldg, Cam Room, Cam Tel, Cam Room Contact, Cam Room Contact Tel, Cam Notes, Board Switch Port Nums, Cam Thumb Image Name, Cam Fullimage Name, Record Image Name, Cam Thumb Compression Level, Cam Full Compression Level, Cam Record Compression Level, Tool Tip Text, Last Pan, Last Tilt, Last Zoom, Cam PTZ (y/n), Server Switch Action, Switch Caption, Switch Notes, Email Notification, Email Address, Email Message, Enable Audio Alert, Play Audio File, Last Update Time, Time Lapse Interval, Tie Breaker Count, User Disabled, System Disabled, System Disabled Message, Recompression Value, Pan String, Tilt String, Zoom String, Home String. These parameters all control the camera and/or server used by the application and can be changed via a hardware setup form that is provided by the software for the user and that is described further below.

Once all tests are complete, the process moves to FIG. 3 where the program 'listens' for digital input triggers generated by any of the cameras supporting this function. The client program 42 can listen for these trigger events and either flash or highlight the window associated with that trigger input, show a high frame rate view (motion window) or begin recording an image or series of images in the above formats. Trigger events are recorded to one of the database 56 tables by recording the date, time and image name. The user can review and access images saved during triggering. As will be known to those skilled in the art, triggering is accomplished by enabling a CRON script in the server that will send a message to the client computer 22. Program 42 uses winsock controls to listen on a predefined port (1111 default). If a trigger message is received, the message is parsed for the server ID and port number. This information is compared to the relevant data from database 56 and the appropriate display window 46 is activated. The CRON script comprises one or more control instructions generated by program 42. Although the CRON script can be generated directly using a web browser on the client computer, it will be appreciated that generation of the CRON script by program 42 eliminates common typographical errors encountered in manual CRON programming. Unique identifiers such as host PC and port are automatically added to the CRON script by program 42.

Once the process begins listening for triggers it then finishes configuring the user interface display grid 44 on the client computer 22. The display grid 44 shown in FIG. 1 is a 3×3 grid for up to nine cameras and it will be appreciated that any size grid can be specified, with the program 42 permitting the user to specify the number of windows and the program then automatically scaling the images 48 to fit the resulting display window size. In configuring the view grid, the program 42 may disable some camera images 48, showing instead a "No Video" or other message in the display box 46 associated with the camera 24. This disabling may be due to, for example, the camera 24 being unreachable, disabled, or invalid. The software also sets the "record" indicators (if enabled), the show port numbers (if enabled), and the camera caption (camera name, if enabled). These are discussed below in connection with FIG. 5.

Once the screen display 44 has been configured, the display loop begins in which the program accesses and displays images from the cameras 24 on the user's screen, with the software periodically updating the display of each image 48. Starting with the first camera displayed, the program sequentially accesses each camera 24 and displays the received image 48 in the box 46 associated with that camera, scaling the image to fit the user's selected view size. The process runs through the display loop once for each camera 24, incrementing the current frame (display box) for each iteration until it has retrieved and displayed a snapshot image from each camera. It then continues looping through the display loop, starting again at the first camera, and runs through the process continuously, sequentially polling each camera and updating each window 46 with an updated image 48 received from the associated camera. As each display window is being updated, it can be highlighted using, for example, a colored border to distinguish it from the remaining display windows. This allows the user to see the sequential polling process and is especially useful where the images change little if at all from one update to the next.

The display loop of FIG. 3 continues until either a trigger event is received, a double-click by the user is detected on one of the displayed windows 46, a stream request is made by double-clicking the port number on the camera window, or the user cancels the monitoring, in which case the program pauses. If the user selects a window 46 by double-clicking anywhere on its image 48, a motion form is displayed that permits viewing a setting of various camera parameters, as well as permitting the user to set recording parameters (such as number of frames to manually record) and initiate recording from the camera associated with the selected display window. The motion form and its use will be described further below in connection with FIG. 9. The program checks during the display loop to determine if the user has enabled recording. If so, the program checks user recording settings that can be set through the hardware setup process of FIG. 6 using the recording camera setup tab of FIG. 8. These user configurable settings include selections to record all frames received, or interval recording where the user can specify that frames are only recorded once every so many seconds or minutes. The user can also specify that recording should only occur when motion is detected in the received video. A preferred routine for implementing the motion detection will be described further below in connection with FIGS. 17a and 17b. Once these user settings are read, the program then checks scheduler settings that are also user configurable under the recording camera setup tab. These scheduler settings allow the user to specify certain hours during the day and days during the week when the recording is either to occur or be blocked. Scheduling can be done in 15 minute intervals. Every 15 minutes the user can select No recording, Standard Recording (FIG. 15), or Video Motion Detection Recording FIGS. 17a-17b). The program will compare this schedule to the current time of day and adjust the recording functions as necessary. This allows for up to 96 different recording schedules per day, far exceeding any typical user need. If recording is permitted for the current time on this particular day, then the program proceeds to the appropriate recording routine (record all frames, time interval recording, or motion detection) according to the user configurable settings previously read.

As a part of the display loop, program 42 requests images or video streams from one of the cameras 24. The requests are formatted as standard CGI based URL syntax, i.e.:
http//Uid:PW@111.111.111.111/cgi-bin/
fullsize.jpg?camera=1&compression=1).

The images are downloaded from the cameras 38 and servers 26 to the client computer 22 where they are stored in a memory buffer, which can be implemented in RAM. The buffer is parsed and augmented with formatted date and time stamps, accurate to the millisecond. The image is assigned a name generated by the program based on the date and time of creation. The program 42 then saves the image to the hard drive 40 using the following directory structure:
Mapped Drive and Root Path/Server Name/Camera Name/
   Year/Month/Day This directory structure is generated in real-time as the recording executes. The images are saved in one of the following styles, based on user setup preferences:
   Single Images: Images are saved under the Day directory in
      a graphics file format such a jpegs. The file naming convention used is hh mm ss.jpg, where hh is the current client computer clock hour in 24 hour format, mm is minutes, and ss is seconds.

Multiple Images (video): Video images (i.e., time sequences of individual images) are saved at the Month directory level as hh 00 00.jpx, where the .jpx extension represents a jpeg concatenation file (streaming jpeg), which is a single file that is built by the program 42 and that comprises a series of jpeg images concatenated together. hh is the client computer clock hour in 24 hour format. These .jpx files can be read and played back by the image viewer 52.

Before storing the jpeg image files or concatenating the jpegs onto a jpx stream, the images can be compressed using the compression .dll library noted above. In practice, it has been found that good quality recorded images consume an average of 7,500 bytes per image. Higher compression levels can yield a smaller file (down to 2,500 byes) at a reduced quality. Higher quality images can also be recorded at a file size of 70,000 bytes per image up to 250,000 bytes per image.

The program 42 can acquire images from the cameras in any of three modes:

Snapshot: Request one image from the server and close the connection. By running through the display loop rather than requesting a continuous stream from the server, the program iteratively requests snapshots from the cameras and servers thereby providing continuously-updated images in a manner that requires little bandwidth, with network utilization typically peaking at no more than six percent, regardless of network size.

Stream Frame Mode: Connect in stream mode to each camera and sequentially cycle through each of the cameras, obtaining one or more of the streamed images from one selected camera, pausing the streaming from that camera, and then obtaining one or more streamed images from the next camera until all of the cameras have been accessed and then paused. This cycle is repeated continuously until the user switches the program back out of this stream frame mode. In this mode, the processing is identical to that of the snapshot mode, with the display loop extracting at least one frame from an open stream, and then indexing to the next camera. The connection is periodically reset to remain robustness. This approach to image acquisition yields substantial performance gains over the snapshot mode and is more efficient that a continuous stream. This connection allows the video server to maintain an authorized connection to the client computer, providing enhanced performance and ultimately, augmented received frame rates. Running in this mode requires more bandwidth than the snapshot mode, but will utilize less than the full streaming mode described below, since each stream is paused as the remaining connected cameras are sequentially accessed for a frame of video. The video server buffers surplus video to the point of filling up its internal buffers, at which time the server stops grabbing video frames until the buffer is depleted, or the server is reset. Thus, as will be appreciated by those skilled in the art, this approach can also be used to control the frame rate of displayed and/or recorded video in a manner that minimizes the network bandwidth utilization. Thus, it can be used for only select ones of the cameras and for recording at a frame rate faster than that obtained by individual URL calls, but less than that provided by full streaming from the camera or video server.

Full Streaming Mode: Launch the stream recorder client 50 as a shelled process, pass the URL and various options via a command line syntax. The client computer connects in stream mode and retrieve images in an infinite loop. The connection is reset periodically to ensure robust connectivity across various network topologies. The received image stream is then parsed for SOI (ASCII 255+ASCII 216) and EOI (ASCII 255+ASCII 217) markers, which are the standard start-of-image and end-of-image markers. A buffer is built until these markers are found. When found, the image is displayed and that section is removed from the buffer. This process is then reiterated until a timer expires the session or the user manually closes the connection.

When recording, the stream recorder client 50 writes directly to the same directory used by program 42, but uses a different naming convention to avoid contention. This naming convention can be implemented by appending a letter suffix to the filename of the jpx stream. For example, program 42 might record a filename as "11 00 00.jpx", whereas program 50 might record images obtained at the same time as "11 00 00_s.jpx". Since they are now uniquely named, there is no concern of one program overwriting the image files of the other.

Referring now to FIG. 4, the .ini configuration file used for program 42 will now be described. The WindowState=Normal (or Maximized) sets the main camera view grid as either normal, with the display being sized based on the Images_Across, Images_Down, Ref_Image_Width, and Ref_Image_Height parameters. The Ref_Image_Width specifies the image width of each display window 46 in units of twips (which is a known measurement unit defined by Microsoft™). There are approximately 1440 twips per inch. The image width is determined by the default image metrics that can be specified by the user via the defined in Setup/Software menu command. The Images_Across parameter specifies the number of cameras to be shown horizontally within the user interface display 44 and the Images_Down parameter specifies the number of cameras to be shown vertically. An exemplary 3×3 display grid (for a total of nine camera windows) is shown in FIG. 1. In the event that WindowState=Maximized, the entire screen is filled with the application's main window and displays the camera view grid in the center of the window based on the parameters noted above. The Display=Image (or List) sets the initial display type, with "Image" resulting in a display of the view grid 44 with camera images 48 shown in the display windows 46 and "List" providing a textual list of the cameras and servers with no images.

The HighliteFrameColor specifies the hex RGB value for the current update window, that is, it identifies the color used for the border placed around the camera window currently being updated at any one time during the display loop of FIG. 3. The default color is blue. The FlashFrameColor provides the hex RGB value for the camera window corresponding to the camera for which a trigger has been received. The default color is red. The ViewBackColor specifies the hex RGB value for inactive camera windows, with the default being grey. The TCPPort parameter specifies the IP port on which the camera server transmits images and the program 42 application listens. This information is used in the base CRON script.

The RecordMode setting can either be SINGLE or MULTIPLE, which respectively correspond to the single image jpeg and video stream jpx file formats discussed above. For "Single", the received images are written to disk (or other non-volatile storage media) as a single jpeg file using the naming convention provided above. For "Multiple", the images are written as jpx streams, with the RecordMode parameter ("24" shown in FIG. 4) referring to how many jpx files are written per 24 hours. This parameter can have any of the following values: 1, 2, 3, 4, 6, 8, 12, 24. Thus, "1" means that the received stream of jpegs are written into a single jpx file over a 24-hour period, whereas "24" means that a new jpx file is started every hour, 24 per day. As mentioned above, the jpx format is a straight concatenation of jpeg files and, by storing the files with the .jpx rather than .jpg extension, the software avoids the possibility that a user opening the file will inadvertently launch a standard .jpg viewer that might hang due to the large sizes of the jpx files.

Figure 8:
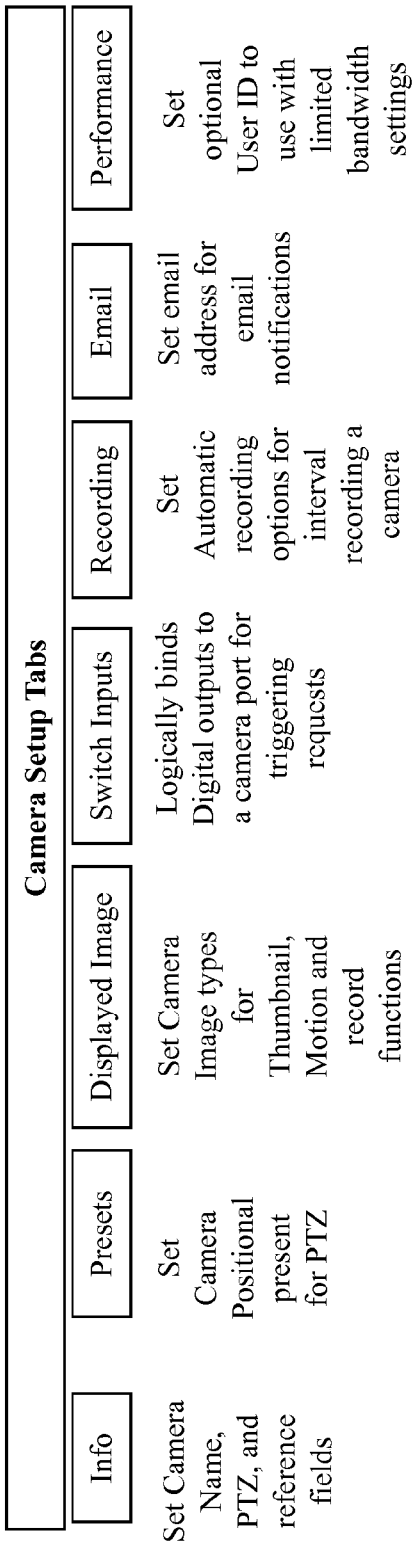
FIG. 8 is a diagram depicting the camera setup form displayed by the user interface client.

The RecordThumbnails=TRUE setting is used to tell the software to record the displayed thumbnails rather than recording the image at the Record Image parameter that is specified in the Camera Hardware Setup form of FIG. 8. This setting causes the program to record the same image that is viewed in the display grid 44. When set to FALSE, the program accesses and displays one image (a thumbnail) from the camera and then accesses and records a second image (at a different size) without viewing. This allows for different image sizing and/or compression for viewing than for recording.

The RecordImageBasePath sets the base directory path for recording all images; that is, it sets the "mapped drive and root path" shown at the upper level of the directory structure shown above. The program will create all lower levels of the directory structure if they do not already exist. An error message is displayed if the drive is not available or the directories cannot be created or accessed, and no recording will occur.

The Camera_Database setting is a pointer to the database 56 that is used for all camera and camera server settings. Other settings that may be less often accessed are:

DisplayWidth: Sets the default user interface display 44 size in twips.

BorderWidth: Sets the width of the black spacing between all thumbnail images in pixels.

SkipInactivePorts: TRUE—Thumbnails that are disabled will not be displayed when program 42 is running.

ShowHighliteFrames: TRUE to show border around currently updated thumbnail.

ShowRecordIndicators: TRUE to show the record LED status indicator that can be included at a corner of the display window for each camera.

ShowCameraCaptions: TRUE to show the title caption at the bottom of the thumbnails.

ShowPortNumbers: TRUE to show the physical thumbnail port numbers.

PingTimeout: The number of milliseconds to attempt a ping to the video server before failure abort.

PingOnImageRequest: TRUE to allow ping tests on each received image burst.

CameraCaptionForeColor: Color of the camera caption in hex RGB

CameraCaptionBackColor: Back color of the camera caption in hex RGB

HTTPPort: Http port number to access all cameras. This is a global setting.

MaxFailOverCount: Number of failed camera requests before shutting down the camera port. The display window 46 will show "Unavailable".

ReconnectAttemptIntervalSecs: Seconds to elapse before trying to reconnect a failed camera.

DefaultEmailRecipient: Email address to use when sending a motion alert.

EmailUserID: UserID used for email account access.

EmailUSerPW: User password for email account access.

ShowMotionBorder: TRUE to allow the video motion detection routine to highlight the target window when motion is detected.

EnableStatusLog: TRUE to allow status info to be written to a text log.

EnableErrorLog: TRUE to allow specific Error information to be written to a text log.

StreamViewMode: When launching a streamer, the mode it starts in can be:
0=Icon
1=Small frame window with text info only.
2=Normal window with video displayed.

StreamIntervalSeconds: Number of seconds to allow the streamer to run before closing:
0=Run forever
1 to 84600=1 sec to 24 hrs run time before closing.

StreamMaxFPS: Maximum number of FPS to stream; 0=Max speed

StreamRecord: 0=no record on program launch, 1=record on launch.

Referring now to FIG. 5, there is shown the menu structure for the Main Menu displayed by the program 42 as a part of its user interface. In the Display menu, the "List" command displays the cameras as a text grid only—no image is displayed. The "Thumbnail" command displays the cameras as a graphical grid, displaying images 48 received from the cameras 24 using the display loop of FIG. 3. In the Setup menu, the "Hardware" command launches the Hardware Setup form which permits hardware configuration using the process of FIG. 6. The user can add/delete/edit the different server and camera settings. Also in the setup menu is the 'Software' command which launches a form that allows the user to graphically modify the core setting of the .ini file. The ability to manually edit the file also is available via the 'Other' Tab and then the first 'Edit' button. The ini file can also be edited with any user editor such as Microsoft™ Notepad. The Archive menu contains a single command, "Browse Archived Images" which launches the image viewer 52 executable shown in FIG. 10. The Help menu includes a "Dump all Server Settings" command which writes all server and camera data to a text file. This information will be located in the application's directory in a file called CameraDump.txt. This information can be useful in troubleshooting functional problems with the system.

Figure 6:
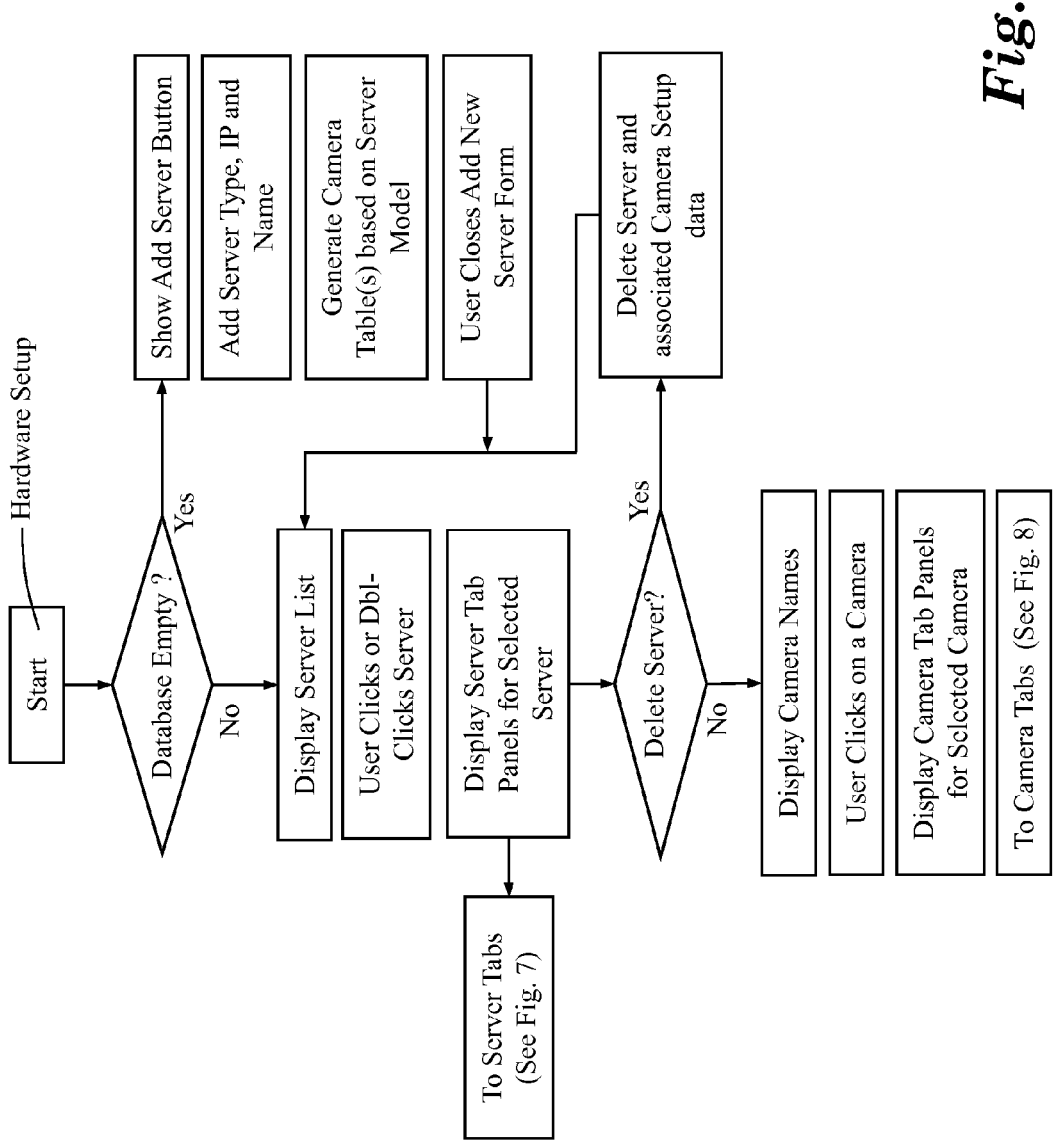
FIG. 6 is a flow chart showing the process used by the user interface client to provide hardware setup information.

FIG. 6 depicts the Hardware Setup routine that is invoked by selecting "Hardware" under the Setup menu. This process is used to add or delete cameras and servers, and to edit existing camera or server setups, if desired. The servers and cameras are shown in a tree structure on the left side of a new window on the computer screen and, where an existing server is selected, a set of server hardware setup tabs (shown in FIG. 7) are displayed on the right side of the screen to permit configuration of various server parameters, including many of the control information items listed above. Where an existing camera is selected, the camera hardware setup tabs of FIG. 8 are displayed on the right side of the screen for editing of camera parameters and control information noted above. All panels for each of the tabs of FIGS. 7 and 8 includes an Update button to save changes made on the tab.

Figure 7:
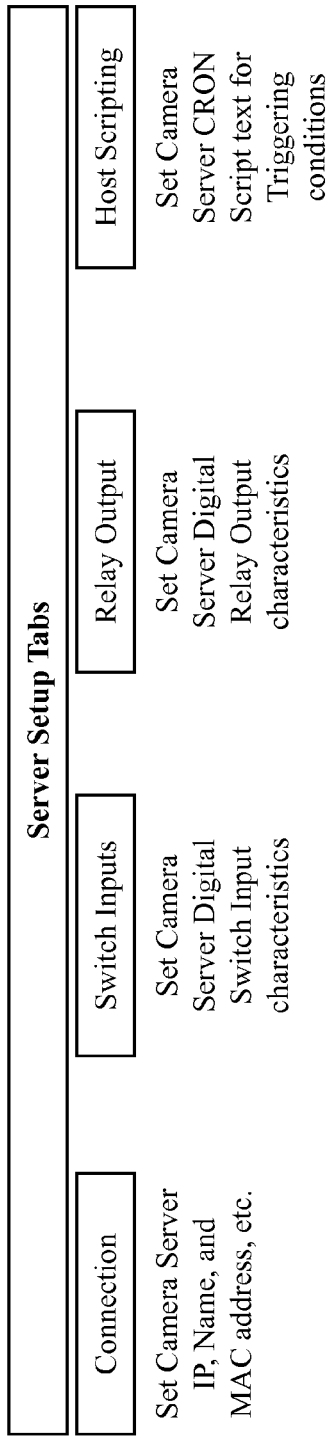
FIG. 7 is a diagram depicting the server setup form displayed by the user interface client.

For the server hardware setup tabs of FIG. 7, the Connection tab provides a display that permits the user to set the fundamental server settings for the program's CGI base parameters. These options are used in the URL requests to the server. The Connection tab contains the basic server information. The fields are:

| Server Name | Name to identify the server. |
|---|---|
| Server Model | Name to identify then camera. |
| Server Enabled | Check to enable, uncheck to disable. |
| Server Serial Number | Authenticates the server. Numbers and Letters |

| | |
|---|---|
| | only. |
| Server IP Address | IP address as 123.123.123.123 |
| Server Root ID | Root user ID. Can also be a regular User ID. |
| Server Root Password | Root user PW. Can also be a regular User PW. |
| Server Notes | Notes for this Server, for reference only. |

If the Server Root ID and Server Root Password are not used, the Host Scripting tab will not function. The Connection panel also includes two buttons:

| | |
|---|---|
| Add New Server | Creates a new Server. |
| Delete Server | Deletes an existing Server. |

The Switch Inputs tab contains the information related to the digital inputs on the server and can be used to set the program's preference settings for trigger responses from the server. This includes the Show Motion form, Flash Window, and Record Image options shown in FIG. 3. The ports are disabled by default. The fields are:

| | |
|---|---|
| Switch Port | The port being edited. |
| Switch Action | The action to be performed upon trigger. |
| Switch Caption | The name to identify the Switch Action. |
| Enable Audio Alert | Enables or Disables an Audio alert segment. |
| Play Audio | Windows .wav file to play upon a trigger event. |

The Relay Output tab provides a display that permits editing of functional settings for latching or pulsing the server relay output. As is known to those skilled in the art, this relay can be attached to a siren, autodialer, or other device compatible with the characteristics and limitations of the server's relay. The fields are:
Enable Relay
Relay Caption
Relay Notes
The Host Scripting tab provides a display for programming or displaying basic CRON scripts on the server. The basic script allows the server to broadcast trigger events from the switch inputs. That is, the script enables to server to send messages to program 42 that are specific to triggering events on the server such as switch closures, infrared, microwave, magnetic, or other forms of sensors. For example, the base CRON script used in Axis™ 2400 series servers is:
0-59 0-23 1-31 1-12 0-6/=xx:
alert-host yyy.yyy.yyy.yyy-port zzzz-message "Port Trigger";
where xx is the server port 1-4, yyy.yyy.yyy.yyy is the IP address of the client computer 22, and zzzz is the port specified in the .ini file for communication between the program 42 and the server. The fields on this tab are:

| | |
|---|---|
| Enable Script | Enable/Disable CRON script activation. |
| Script Text | CRON script text. |

The Host Scripting panel also contains four buttons:

| | |
|---|---|
| Template | Sets a basic CRON script for triggering. |
| Clear | Clears the Script window. |
| Download from Server | Retrieves existing CRON script from the Server. |
| Upload to Server | Sends the Script text to the Server. |

For the camera hardware setup tabs of FIG. 8, the Info tab allows the user to set the camera name, Pan/Tilt/Zoom (PTZ), and text reference fields for each camera, as well as enable or disable the camera. In particular, the Info tab includes the following fields:

| | |
|---|---|
| Camera Name | Name of Camera. |
| Camera Model | Camera Model; Select from list. |
| Camera Enabled | Enables/Disables the Camera Image. |
| Enable Camera Movement | Indicates whether a camera can move. |
| Camera Location | This text is for reference only. |
| Camera Bldg | This text is for reference only. |
| Camera Room | This text is for reference only. |
| Camera Room Tel | This text is for reference only. |
| Camera Room Contact | This text is for reference only. |
| Camera Room Contact Tel | This text is for reference only. |
| Camera Notes | This text is for reference only. |

The Presets tab allows the user to define any quantity of user defined presets for Pan/Tilt/Zoom. The user is shown a thumbnail of a static snapshot for any new positional requests. The fields are:

| | |
|---|---|
| Preset Views | Enables the user to Add/Change Views |
| Preset Notes | Text Notes for the selected preset. |
| Pan | Pan Value |
| Tilt | Tilt Value |
| Zoom | Zoom Value |

There is one button:

| | |
|---|---|
| H | Sets the Preset to HOME |

There are three slider controls:

| | |
|---|---|
| Pan | Pan Value |
| Tilt | Tilt Value |
| Zoom | Zoom Value |

The Displayed Image tab allows the user to set the image size and compression level request for the camera server image retrieval. These parameters are mapped against CGI type parameters defined by the server. The user representations are simplified terms versus the CGI syntax. Three image styles are defined here. Each style is set for the three image request types. This value is used by the server when sending requested images to the application. The fields are:

| | |
|---|---|
| Thumbnail Image | Main View with all cameras. |
| Full View Image | Detailed View of a single camera. |
| Record Image | Recorded Image style. |

The Thumbnail Image is displayed on the Main form with all the other camera views. The Full View Image is displayed on the Motion form. The Record Image is used whenever a save request is made by the application. Each Image style has a related compression value. The compression values are selectable for each Image style. The following considerations should be used when selecting the Image styles:

| Image Size | |
|---|---|
| Largest images: | slowest access, largest file size |
| Smallest images: | fastest access, smallest file size |
| Compression Value | |
| Lowest compression: | best image quality, slowest access |
| Highest compression: | worst image quality, fastest access |

The Switch Inputs tab allows the user to bind any or all available digital switch ports to a display window. That is, the digital switch inputs must be bound to camera ports. This setting tells the application which cameras to record/notify when a trigger event occurs and allows the application to notify the user on screen which port trigger(s) is/are associated with a camera view. Each defined switch input is listed with a check box that can be selected to bind the camera to that switch input.

As mentioned above in connection with FIG. 3, the Recording setup tab permits the user to set automatic recording options for interval recording a camera. The interval is expressed in seconds. The camera will record an image at the specified interval if the hardware can meet these expectations. Otherwise, the image is recorded as quickly as possible after the interval has expired. The fastest interval that can be used is derived from observing the cycling rate of all cameras. On a quality system the fastest interval is about ¼ second for any camera. The fields are:

| | |
|---|---|
| Interval Recording | The camera will record images at a set interval. |
| Record an Image every . . . | The Interval to record images automatically. |
| Compression Index | This value sets the save compression value. |

The compression value is used by the compression library to set the amount of compression for image saves. The lower the number, the higher the compression. The range is between 5 and 40. The most commonly-used value is between 30 and 35.

The Email tab permits the user to set an email address to which an email notification will be sent upon occurrence of a trigger event. An image from the triggered camera can be attached to the email. The Performance tab permits the user to specify a unique User ID so that the camera or video server administrator can set or limit the bandwidth of video transmission on a user-by-user basis.

Figure 9:
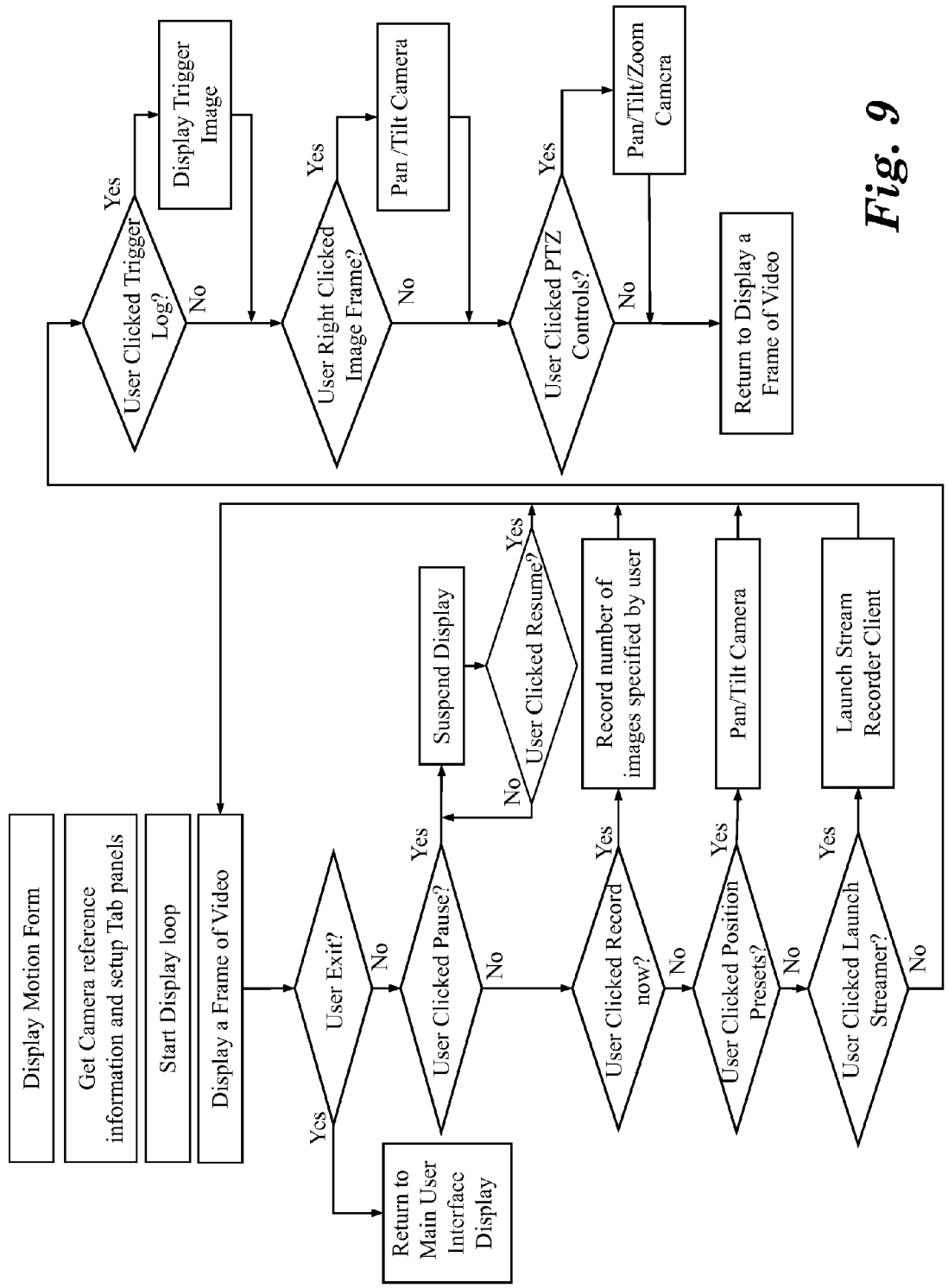
FIG. 9 is a flow chart showing the process used to display a motion form that allows the user to display and record video streams from one of the cameras.

When a user double-clicks on a camera window 46, the program 42 brings up a Motion Form which runs the process shown in FIG. 9. This permits the user to bring up a detailed view of the image from a particular camera, with the image being updated at an increased rate. Complete camera and server information is displayed on this form. The user can Pan/Tilt/Zoom supported cameras, click on preset positions, record images, or display any trigger events.

Figure 10:
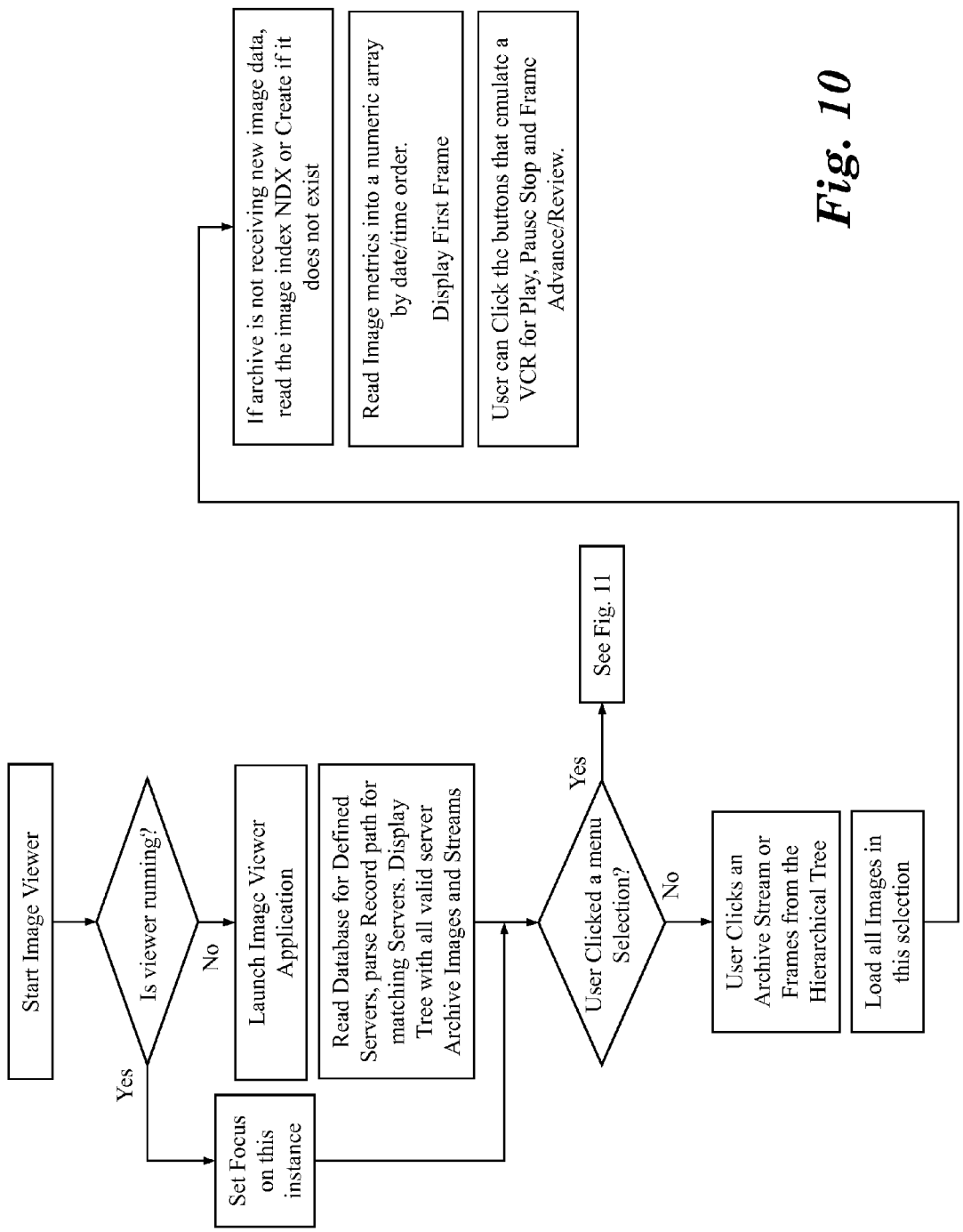
FIG. 10 is a flow chart showing the process flow for the image viewer program of FIG. 1.

FIG. 10 depicts the process flow provided by the image viewer program 52, which can be, but need not be, a separate executable than program 42. This process can be launched from within program 42 using the "Browse Archive Images" command in the Archive menu of FIG. 5. This program 52 can include authentication capability to provide the user with access to only those archived images that have come from servers accessible to that user. This is indicated in FIG. 10 where the program reads the database for defined servers and parses the record path for matching servers. Then it will display a tree structure showing only those archived images and streams that came from cameras or servers defined in the database for that user. Once the user has selected an archived jpg or jpx file, the image is brought up on the screen and, for jpx streams, the user can play, pause, stop, frame advance and review using buttons that emulate a VCR panel. A refresh button can also be provided to reload the archive if additional images are being written to it in the background by the user interface client program 42. The image viewer program 52 can include an autodelete function, in which case a five minute timer is started. The program then checks the archive age against user date settings, and deletes the archived .jpg and .jpx image files that are older than the specified date or time period. The program 52 can also include an autoindex feature which, when enabled, automatically indexes the archived jpx files every hour to build an index into the jpx file for quick access by the program into any point in the jpx file. This index feature is discussed next. If the autoindex feature is not enabled, then the index is not built until the first time the jpx file is loaded.

In installations where very high speed recording is being performed, the jpx file can become quite large. A typical jpx file for an hour of video is 1 to 5 MB, while high speed recording can easily exceed 20 MB and even reach 100 MB. Since the jpx is purely concatenated JPG images, aligned head to tail, the only way to view the images within the jpx file is to parse the SOI and EOI markers and display the image in between them. For incremental playback, this process is easily controlled. However, when a user wants to "rewind", "fast forward", or randomly jump to a portion of video, this process requires the program 52 to process from its current position and read all video frames in between. Jumping over frames does not work for these files since, in order to most efficiently store the images, the images within the jpx file are relatively unique in length. This process of reading in all of the frames can be undesirably slow when the jpx file is large. To overcome this issue, the image viewer program 52 creates an index of the SOI and EOI markers of each image in the jpx file. This index is stored as an array of pointers into the jpx file and is stored using .ndx as its filename extension. The program 52 will look for this index and use it to load the image pointers instead of reading the entire jpx. The image pointers identify the memory locations of the SOI and EOI markers, thereby allowing the program to easily locate and retrieve individual images contained within the jpx file. The ndx file can be loaded in less than a second, as compared with jpx load times of up to a minute or more, depending on jpx size. The index is created on the first user access to the jpx image file or when an autoindex event is processed, as described above. Successive requests from the user to a jpx will allow the program to read the ndx file rather than a conventional approach which would entail reading the entire jpx file. With the index file, the pointers can be read into memory and accessed quickly, even for very large jpx files.

The ndx index file also makes possible the use of the image viewer program 52 as a plug-in for commercially available web browsers. In conventional browser-based retrieval of video, the video files can be quite large, and the user can therefore typically only request a small number of frames. The user does not know the stream size, frame count, index of time pointers, etc. By implementing the image viewer 52 as a plug-in component for a web browser, viewer can be used to provide web page access from a web browser to stored jpx images. This alleviates the necessity of a specialized software product to view the archives. Since this image viewer plug-in utilizes the ndx index file, the user can retrieve a wealth of video specific content in a very short period of time, allowing realtime display of video (assuming the user has sufficient bandwidth) of the Internet or other network.

When implemented as a plug-in, the image viewer 52 can also be used to view "live" a stream that is being recorded on a network server. This can be accomplished using server software that records the jpx files in the manner described herein, with the image viewer then only parse the target jpx file on the network server for the latest video frame. By displaying this video frame, the user sees live video that originated from the camera server, but is being supplied by what can be a much higher performance network server. Thus, since the user is now viewing recorded video from a higher performance server, the number of simultaneous connections to the video feed is highly scalable by implementing standard web server components. This is advantageous since all Ethernet video servers are highly susceptible to overload from multiple user requests and performance is degraded linearly with each simultaneous connection.

Figure 11:
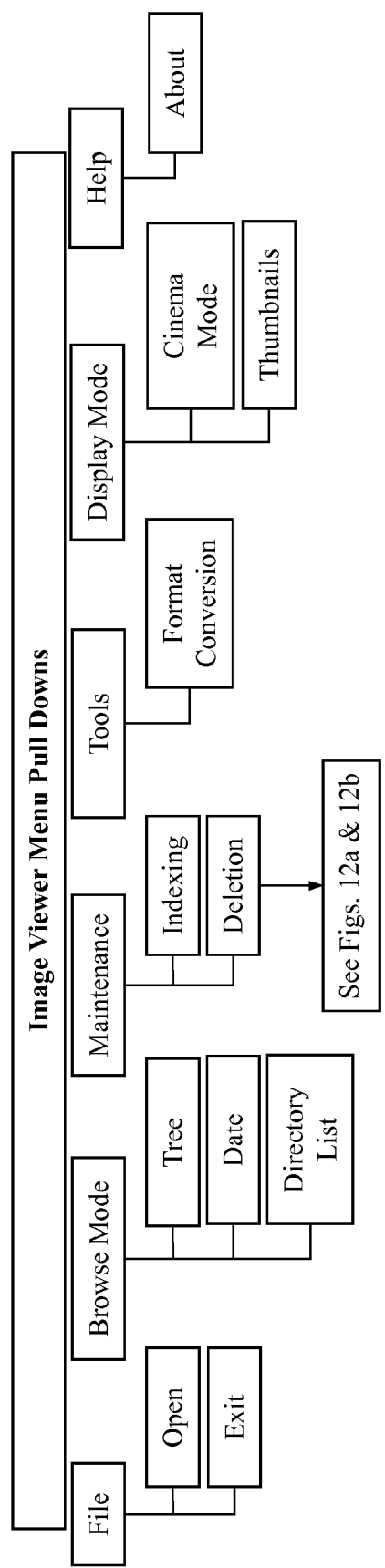
FIG. 11 is a diagram depicting the menu structure of the image viewer program.
Figure 12B:
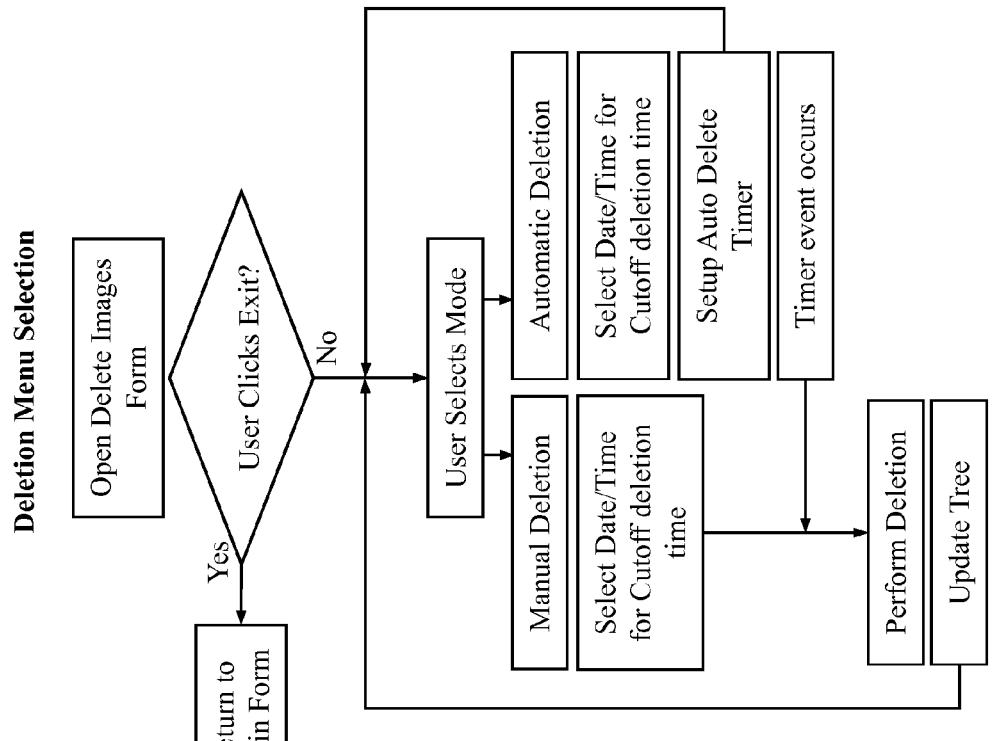
FIG. 12b is a flow chart of the archive delete process used by the image viewer program.
Figure 12A:
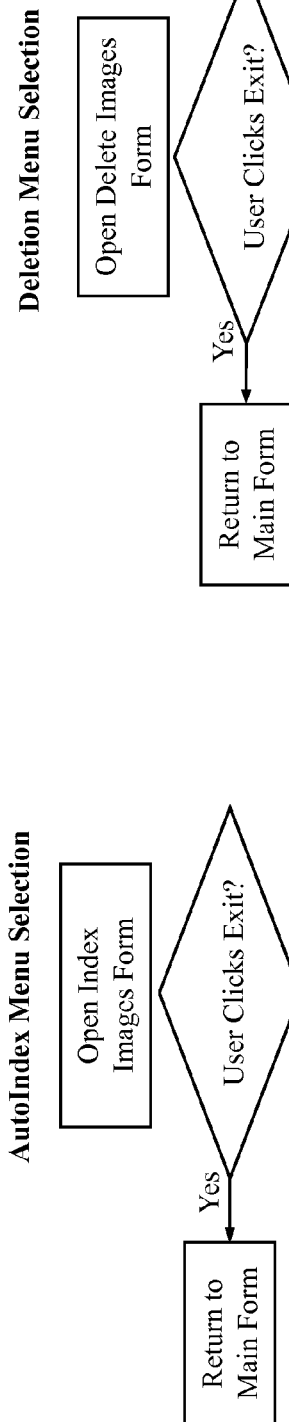
FIG. 12a is a flow chart of the autoindexing setup process used by the image viewer program.

FIG. 11 depicts the main menu for the image viewer program 52. The "Tree" command under the Browse Mode menu item allows the user to browse all permitted archives by server, camera, date, and type. The "Date" command allows the user to search by date/time for a selected server and camera. The 'Directory List' command lets the user browse all attached drives manually. The Indexing command under the Maintenance menu allows the user to set the autoindexing features described above. The process used by the image viewer program 52 for setting up the autoindex feature is shown in FIG. 12*a*. The "Delete" command under the Maintenance menu allows the user to manually delete archives or automatically delete archives older than a selected date/time stamp. FIG. 12*b* depicts the process flow when the "Delete" command is selected. The "Format Conversion" command under the Tools menu allows the user to convert images to other standardized formats. The Display Mode menu allows the user to playback the images either as thumbnails (like images 48 displayed in the windows 46 generated by the user interface client program 46) or in a cinema (fullscreen) mode.

Figure 14A:
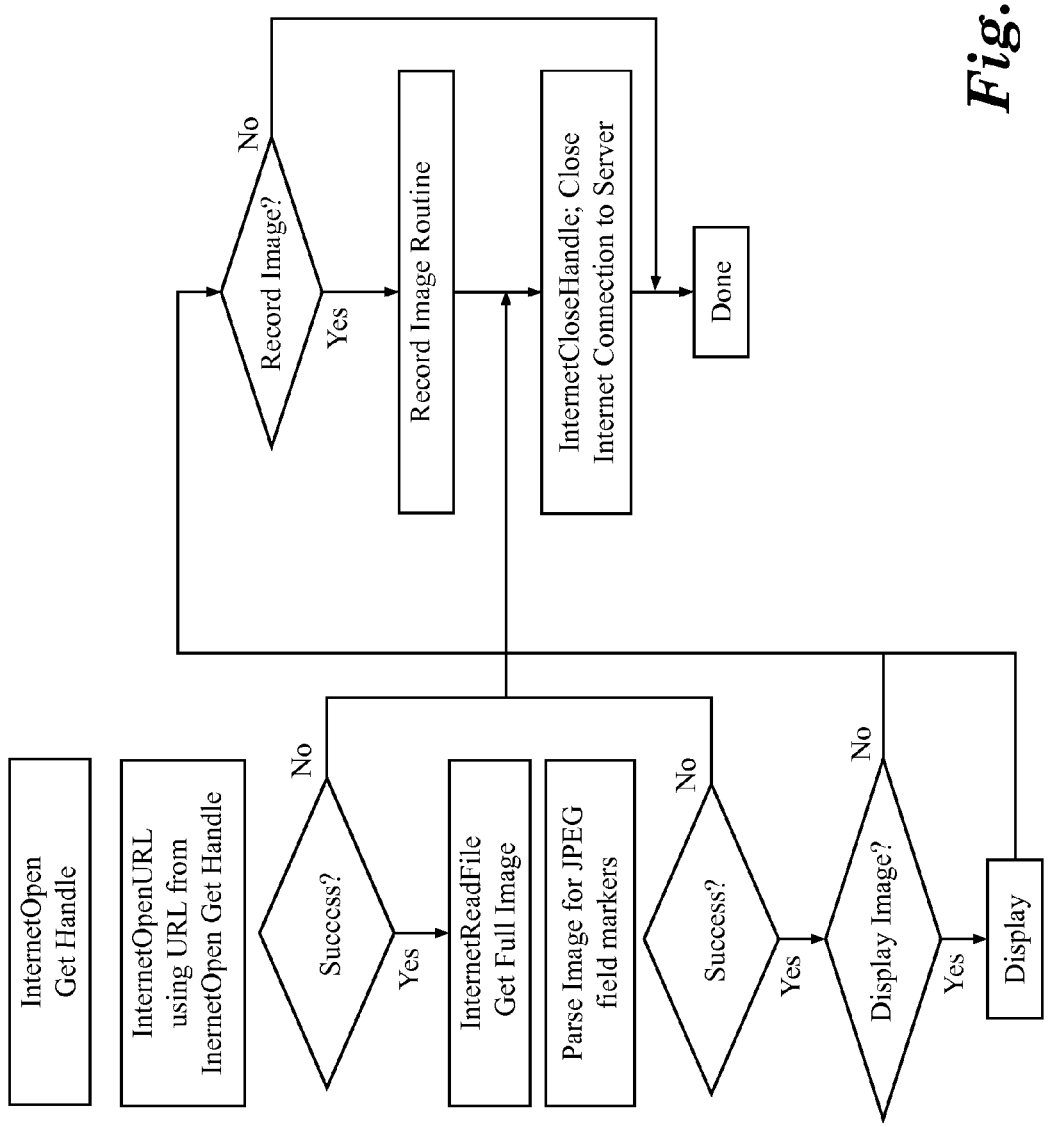
FIG. 14a is a flow chart of a portion of the OCX control that is used to access individual snapshot images from the cameras used in the digital video system of FIG. 1.
Figure 14B:
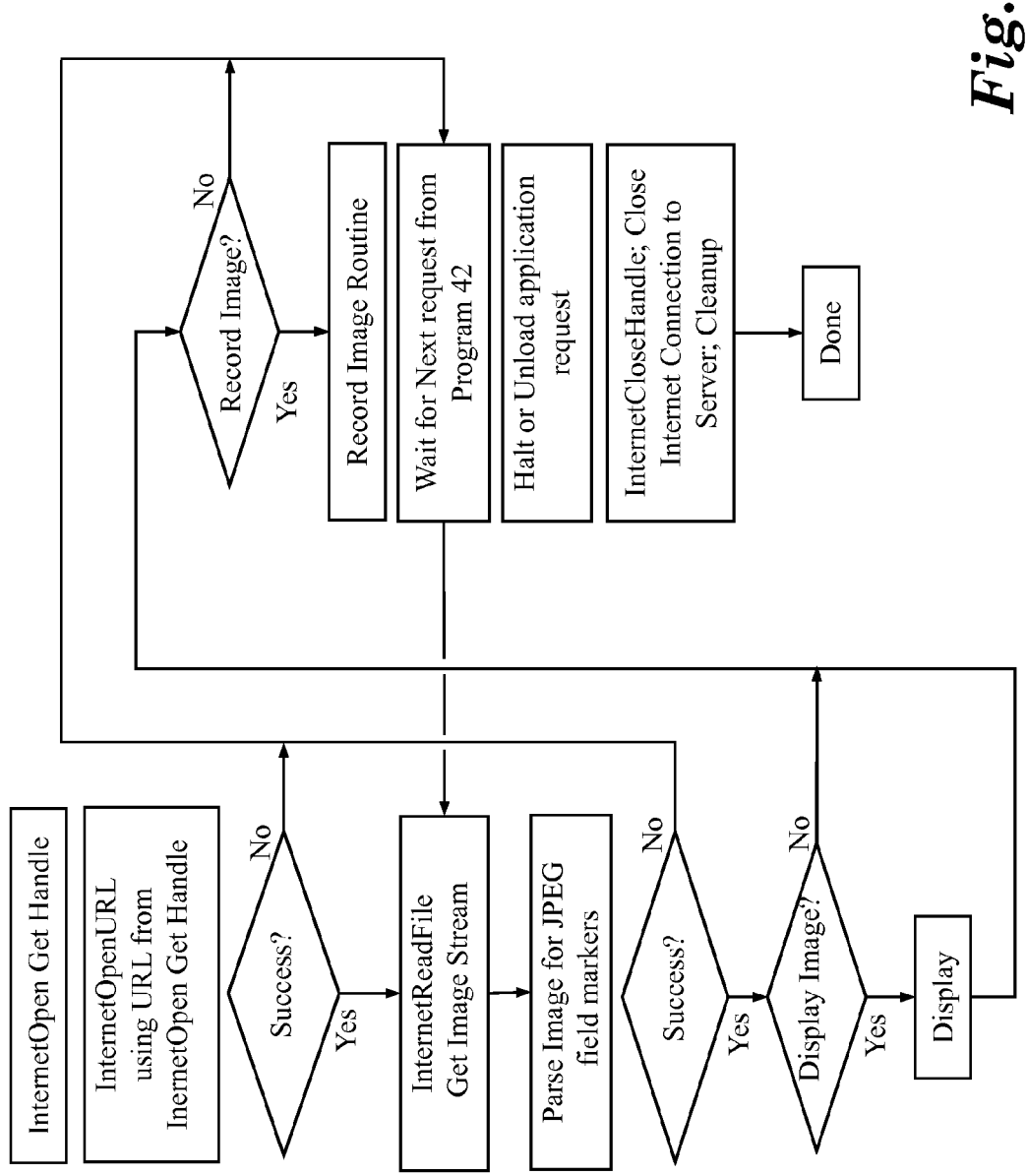
FIG. 14b is a flow chart of a portion of the OCX control that is used to intermittently access images from a streaming image server.
Figure 14C:
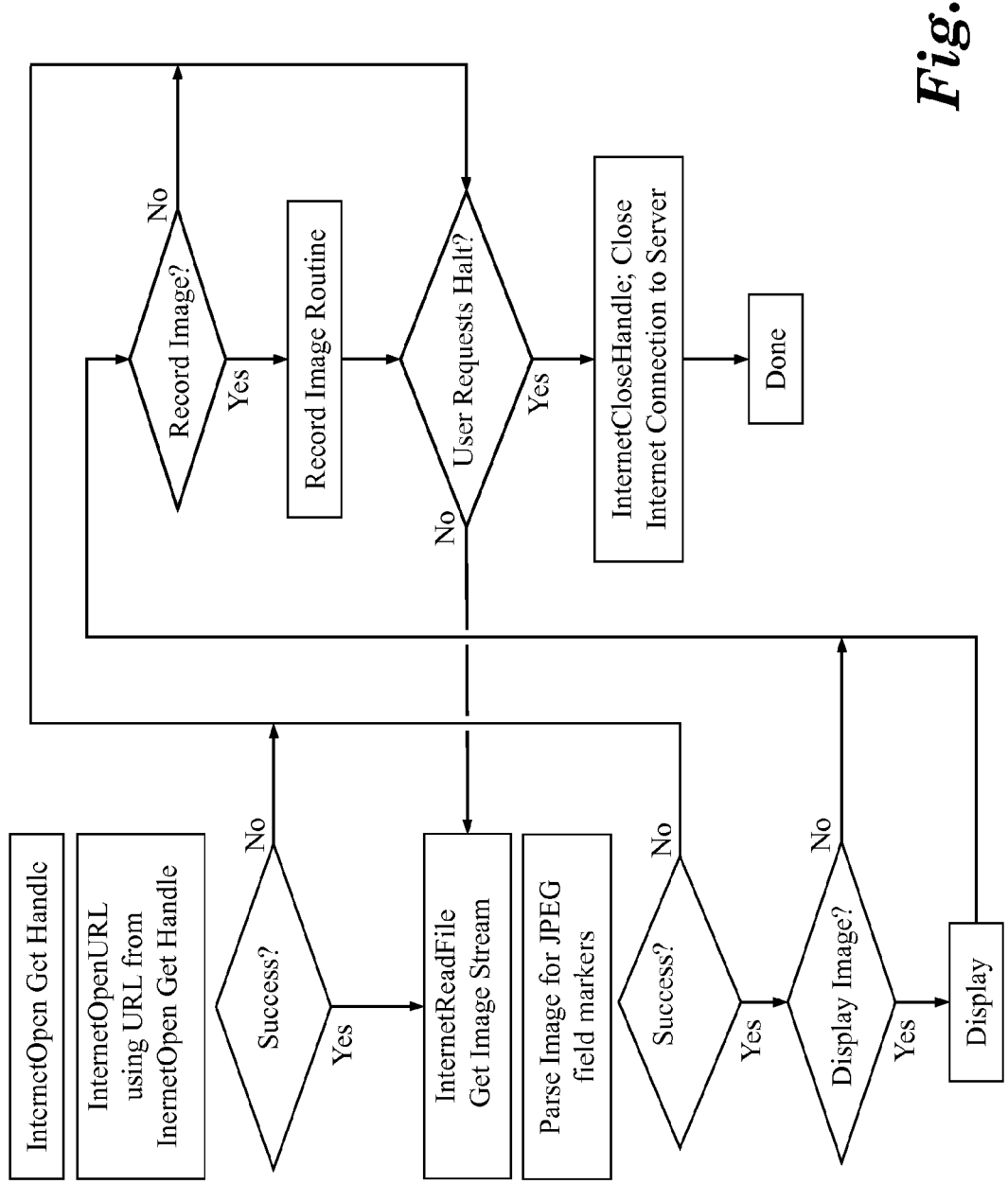
FIG. 14c is a flow chart of a portion of the OCX control that is used to access full video streams from a streaming image server.
Figure 15:
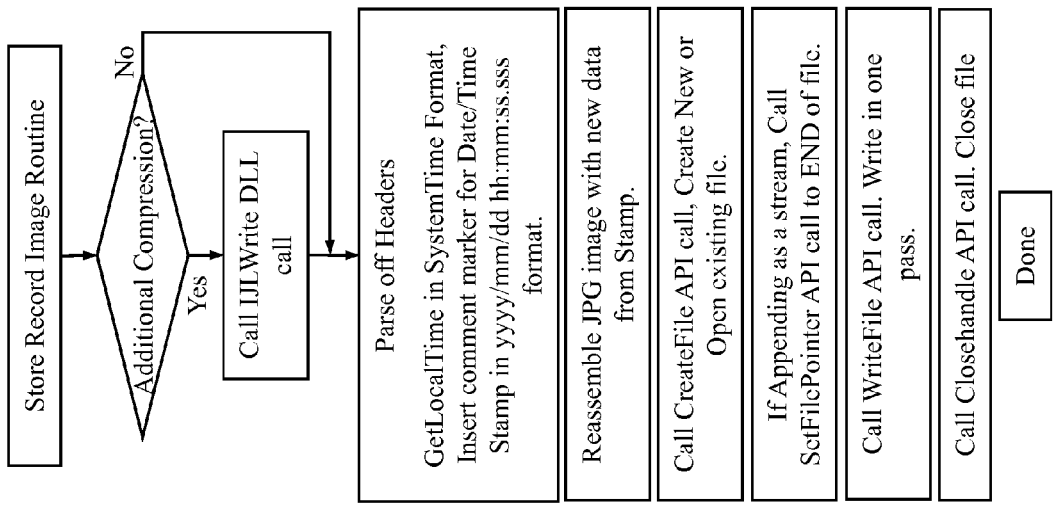
FIG. 15 is a flow chart of a portion of the OCX control that is used in the processing and recording of received images and image streams.

Rather than using the ActiveX control provided by the camera/server manufacturer, the user interface client program 42 and stream recorder program 50 utilize their own ActiveX control to interface with the cameras and servers. An overview of this OCX control is shown in FIG. 13. Further details of the control for obtaining and displaying an image are shown in FIGS. 14*a*-14*c*, and further details of the control for obtaining and recording an image are shown in FIG. 15. The implementation of a suitable OCX control using the process steps shown in these figures will be known to those skilled in the art and therefore no further elaboration of the design of this control is necessary.

Figure 16:
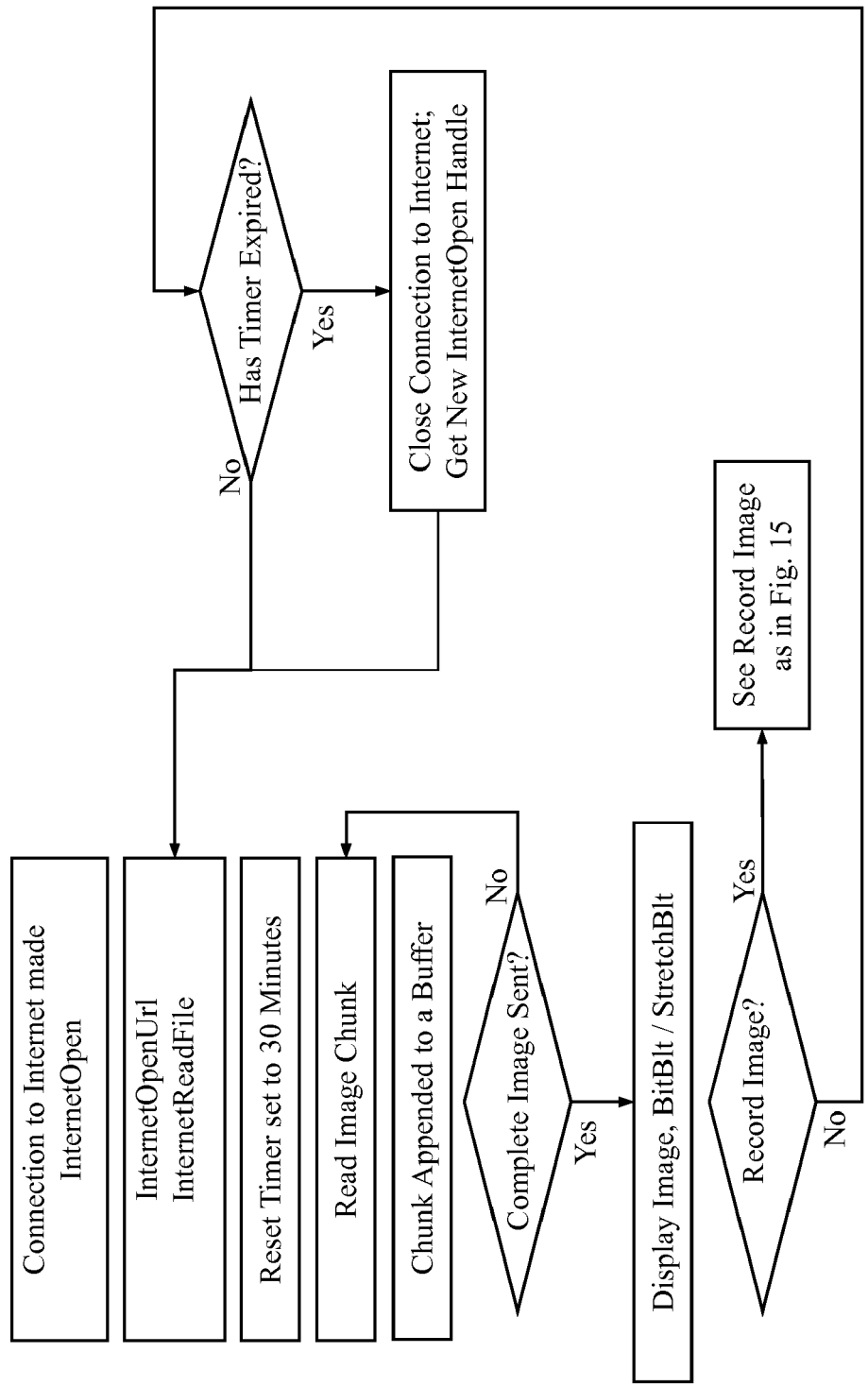
FIG. 16 is a flow chart showing the process flow for the stream recorder client application of FIG. 1.

Referring now to FIG. 16, there is shown the program flow of the stream recording client program 50, which is a separate executable that permits high speed recording of image streams (video) in a manner that minimizes network utilization. The program 50 enables the streaming output from the camera servers using the OCX control described above internally within the program as direct subroutine calls. Streaming is initiated using a CGI enabled URL that is sent in the same manner as described above for the user interface client program 42, except that the CGI syntax is set to zero to indicate streaming output from the server. As indicated in FIG. 16, the program 50 utilizes a timer to reset the connection to the server before it is automatically terminated by the network. More specifically, for some networks, such as the Internet, a connection cannot typically be permanently held, but rather will be terminated automatically after a period of time (e.g., 50-70 minutes). The program 50 avoids this problem and enables nearly uninterrupted streaming by automatically resetting the connection before the external termination and then continuing to append the streaming images onto the end of the jpx file. This can be done with the loss of little or no streaming data from the camera.

Figure 17A:
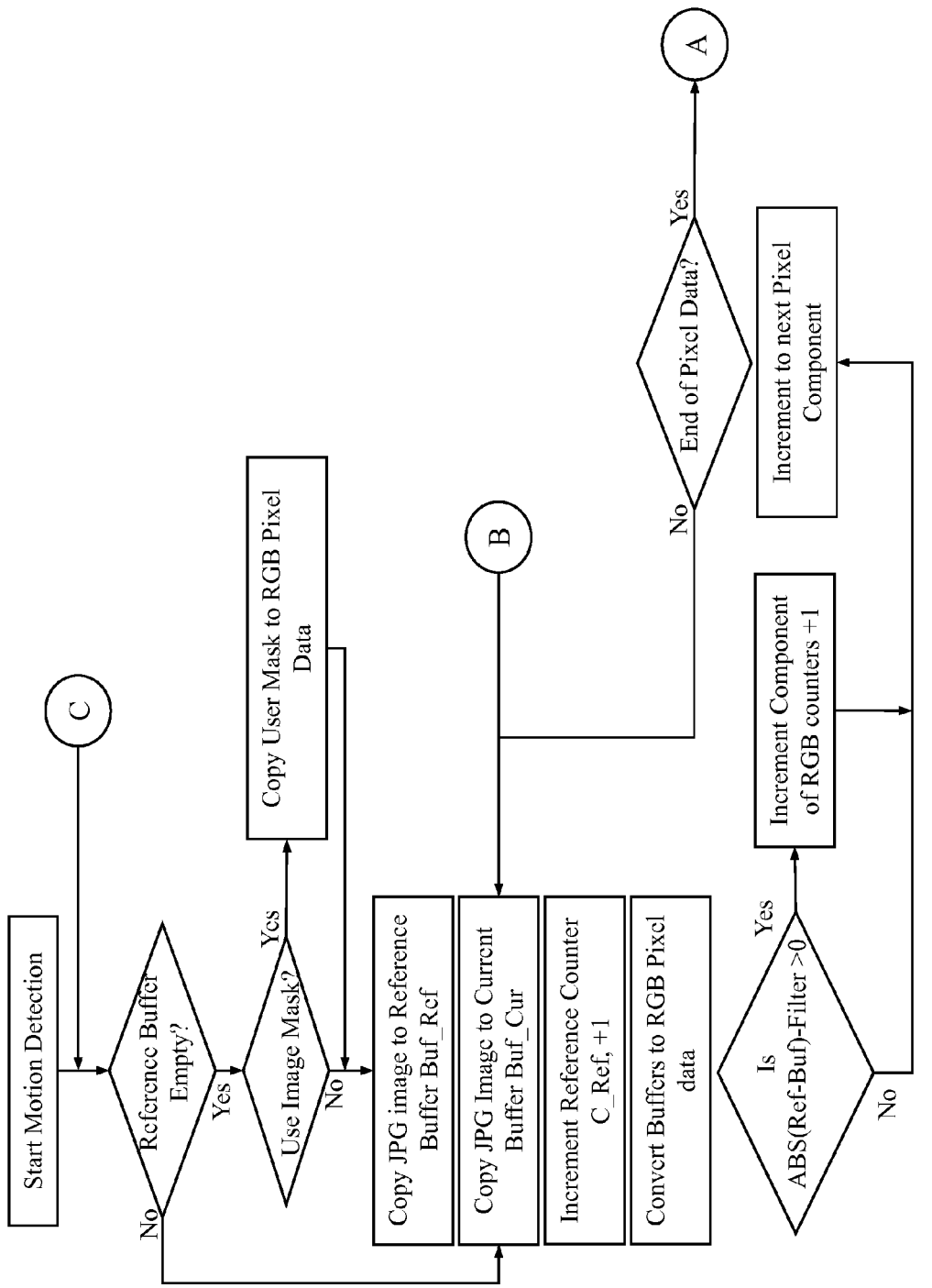
FIGS. 17a and 17b together depict the motion detection routine used by the user interface client application of FIG. 1.
Figure 17B:
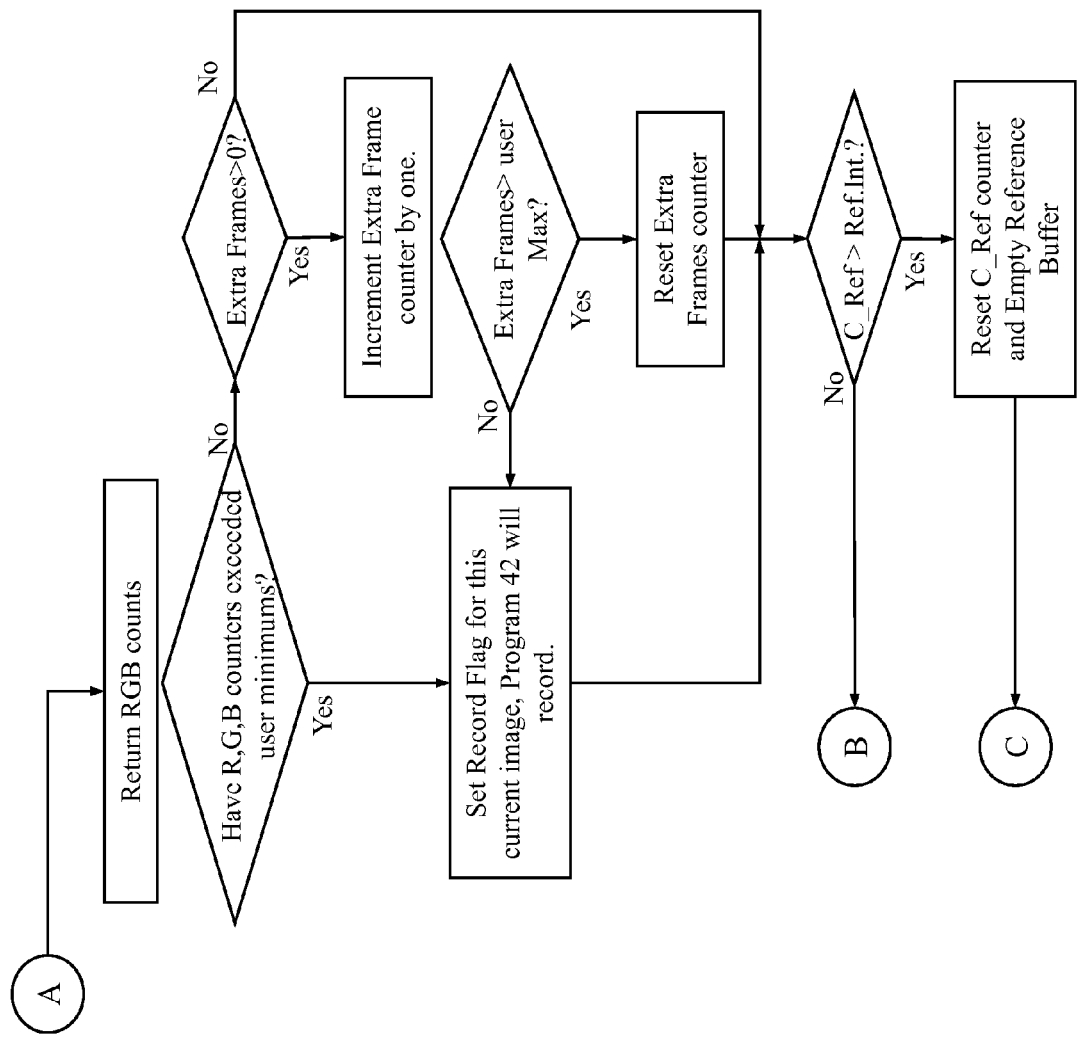

Referring now to FIGS. 17*a* and 17*b*, the video motion detection routine of program 42 is used to allow the recording of images to be performed only when a moving subject is present. When enough motion is present, the system will begin recording video until motion has stopped. When motion is sensed according to this routine, the program will perform any or all of the following functions:

record video up until video motion is no longer sensed and an "extra frames" count is exhausted;

send an email to a user as selected in the hardware setup panel based on settings from the .ini file;

attach an image to the email of the first frame of video that motion was detected on;

show a yellow border around the target window where motion was detected;

announce motion ON and motion OFF with two way files, hello.wav and goodbye.wav, which the user may reset to any sounds desirable.

FIGS. 17*a* and 17*b* detail the logic flow of this process. In general, the motion detection routine uses RGB color component filtering of the actual pixel data. By breaking down the image into these components, the values of each color component per pixel is represented as a decimal value of 0 (No color) to 255 (bright color). These values are compared to user-defined settings in the program 42 for filtering, allowing specific component or combined colors to exhibit reduced or enhanced movement sensitivity. For example, outdoor cameras are very prone to false triggering when blowing grass/leaves or shadows are present. By filtering out more green component, false triggering is reduced to a very acceptable level. This gives the program the ability to use motion detection in a much more broad range of use than other comparable systems.

The process begins by taking the first image (i.e., frame) of a video sequence and placing it into a buffer where it will be used as a reference image. The reference image is compared to subsequent video frames on a pixel-by-pixel basis. Preferably, the reference image is compared to subsequent images as they are being received (i.e., as soon as they are received) by the client computer so that the program is operable to provide real time motion detection. For each pixel in the current image, the program performs a comparison of the color component values for that pixel with the color component values of the corresponding pixel in the reference image. If the difference in color component values for corresponding pixels from the two images differ by more than a preselected amount, the program generates a motion detect signal which can be implemented as the Record Flag shown in FIG. 17*b*. For each of the RGB color components, a separate counter (Count_Red, Count_Green, and Count_Blue) is used that tracks the total number of pixels within the current image for which that color component value differs from that of the reference image by more than a preselected amount. This is done using a user-selectable filter levels for each of the color components. In particular, if for a particular RGB color component, $ABS(P_{ref}-P_{cur})-FilterLevel>0$ then the Count is incremented for that color component. Separate filter levels are used for each color component and these filter levels can be set by the user. As will be appreciated, the FilterLevel is an offset that aids in removing unwanted noise inherent in video sources, as well as "pixelation" or "tiling" inherent in jpg image sources under compression. When the entire image is processed, the Count_Red, Count_Green, and Count_Blue counters are compared to a user specified minimum, which can be different for each of the color components. If all three exceed their respective minimums, motion is considered present and the Record Flag is set to tell the program to proceed with recording.

Once motion is detected, the system records video and continues the pixel comparisons for each subsequent frame until the routine detects that motion is no longer present. To prevent the recording from ending before a subject has completely left the camera's field of view, the program continues recording until a specified number of extra frames have been recorded. This is carried out using an Extra Frames counter that is decremented once per frame starting with the first frame received after no further motion has been detected. As with the other counters, the number used for this counter can be user specified. Periodically, a new reference frame is selected from the video stream. This is done at regular intervals as specified by a user "Refresh Interval" setting, which is an image frame count. This Refresh Interval is used in conjunction with a frame counter C_Ref such that, once the C_Ref counter exceeds the Refresh Interval number, the reference buffer is emptied and the counter reset to zero.

The core function of the video motion detection is based on a count of pixels for which at least one color component value differs from that of the reference image by a preselected amount. Minimum object size detection can be implemented using the routine of FIGS. 17a and 17b with the addition of an X by Y (width by height) template that scans the X by Y pixel information. If all pixels have a color component value that differs from that of the reference image by a preselected amount within the X by Y area, motion is detected. The program highlights the object with a bounding rectangle. This process can be used to filter out objects that are too small to be considered motion.

Apart from minimum object size detection, the program 42 is also operable to permit the user to specify a region of the camera's field of view so that the program performs the pixel comparisons only for those pixels located within that region. This region of interest processing is implemented by providing the user with the ability to mask out specific portions of a video frame, which will then be ignored by the motion detection. This concentrates the motion detection to specific regions of the screen. Typical region of interest masks employ grids or regions based on a grid array of squares. These areas are selected to mask out the regions. This tends to be somewhat granular in use. The program 42 uses a pixel based approach to masking the images. The user first creates a region of interest by defining the mask using the computer mouse to paint a black or other colored area on the image. The painted areas represent those portions not desired for use in detecting motion. A tool palette of square or other shape may be employed to create the painted mask. The mask is converted to a black and white mask and saved as a .bmp file based on the camera name. When video motion detection is used by the program, individual pixels from the reference and current images will be compared only if the corresponding mask pixel is not black. Users may edit the mask in Microsoft™ Paint or other image editor to refine the mask to the pixel level.

Implementations of this type of streaming media have a common difficulty; namely, Ethernet connectivity is at best a highly reliable but not a totally reliable connection. Occasionally, power fluctuations, excessive image requests, overloaded or failing networks and a multitude of other issues can cause the connection to the camera to fail. Competing implementations often cause the application to abnormally abort or stop responding, requiring the user to close and restart the application. This condition is very serious since recorded video will not be available while the program is not responding. The user interface client program 42 and stream recorder client program 50 address this issue by identifying three modes of failure, and providing contingency functions to overcome these problems. These modes are:
1. failure upon connect;
2. failure upon image request (read); and
3. failure during midstream read of image.

Failure types 1 and 2 are easily overcome by the implementation of the default timeout of failed requests by the Wininet.dll and its related components. The program can count these failures on a per camera basis and optionally shut down the camera and reattempt access periodically. This maximum failure count and reattempt connections are user selectable on a global scale.

Type 3 failures are usually serious and can cause the program to stop responding. By executing the request asynchronously or in a worker thread, the request can be timed and if abnormally long, cancel the request and try again. This allows the application to continue to function consistently. Preferably, the program utilizes both methods to insure robust connectivity.

It will thus be apparent that there has been provided in accordance with the present invention a digital video system and computer program therefor which achieves the aims and advantages specified herein. It will of course be understood that the foregoing description is of preferred exemplary embodiments of the invention and that the invention is not limited to the specific embodiments shown. Various changes and modifications will become apparent to those skilled in the art. For example, although the invention has been described as it would be implemented using TCP/IP network cameras and camera servers, it will be appreciated that the invention can be used in conjunction with other image sources. For example, rather than specifying a URL to access a particular camera, the invention could be used to specify a memory location or utilize a .dll file to access images from, for example, a video capture card, USB or IEEE-1394 (Firewire) ports. All such variations and modifications are intended to come within the scope of the appended claims.

I claim:

1. A method of controlling access by a computer to a video server, comprising the steps of:
   sending a request from the computer to a video server over a network;
   receiving at the computer from the video server a unique identifier stored in and identifying the video server, wherein the unique identifier is received by the computer over the network; and
   determining that access to the video server is authorized by comparing the unique identifier received by the computer to one or more authorized unique identifiers and
   in response to the determination, obtaining at the computer one or more images from the video server for displaying.

2. The method of claim 1, wherein the unique identifier is a MAC address.

3. The method of claim 1, wherein the video server is a camera server that includes a camera and a web server with an Ethernet port or a component based video server including inputs for one or more analog video feeds.

4. A method of controlling access by a computer to a hardware device, comprising the following steps performed at the computer:

executing a computer program stored in computer readable form at the computer, the computer being connected to a hardware device via a network;

accessing the hardware device from the computer over the network using an IP address associated with the hardware device;

transmitting a request from the computer over the network for a MAC address of the hardware device;

receiving at the computer the MAC address of the hardware device over the network; and determining if the computer program is authorized to access the hardware device by validating the MAC address using data accessible to the computer.

\* \* \* \* \*